(12) United States Patent
Guizilini et al.

(10) Patent No.: US 11,875,521 B2
(45) Date of Patent: Jan. 16, 2024

(54) SELF-OCCLUSION MASKS TO IMPROVE SELF-SUPERVISED MONOCULAR DEPTH ESTIMATION IN MULTI-CAMERA SETTINGS

(71) Applicant: TOYOTA RESEARCH INSTITUTE, INC., Los Altos, CA (US)

(72) Inventors: Vitor Guizilini, Santa Clara, CA (US); Rares Andrei Ambrus, Santa Clara, CA (US); Adrien David Gaidon, San Francisco, CA (US); Igor Vasiljevic, Chicago, IL (US); Gregory Shakhnarovich, Chicago, IL (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 287 days.

(21) Appl. No.: 17/385,358

(22) Filed: Jul. 26, 2021

(65) Prior Publication Data

US 2022/0301212 A1 Sep. 22, 2022

Related U.S. Application Data

(60) Provisional application No. 63/161,614, filed on Mar. 16, 2021.

(51) Int. Cl.
*G06T 7/55* (2017.01)
*B60R 1/00* (2022.01)
(Continued)

(52) U.S. Cl.
CPC ............... *G06T 7/55* (2017.01); *B60R 1/00* (2013.01); *B60W 60/001* (2020.02);
(Continued)

(58) Field of Classification Search
CPC ....... G06T 7/55; G06T 3/0012; G06T 3/0093; G06T 3/40; G06T 7/11; G06T 7/292;
(Continued)

(56) References Cited

U.S. PATENT DOCUMENTS

2013/0063556 A1 3/2013 Russell et al.
2014/0055450 A1 2/2014 Limonov et al.
(Continued)

OTHER PUBLICATIONS

Attal, et al., "Matryodshka: Real-time 6dof video view synthesis using multi-sphere images", In European Conference on Computer Vision, 2020, pp. 441-459.
(Continued)

*Primary Examiner* — Chan S Park
*Assistant Examiner* — Daniel C Chang
(74) *Attorney, Agent, or Firm* — SEYFARTH SHAW LLP

(57) ABSTRACT

A method for self-supervised depth and ego-motion estimation is described. The method includes determining a multi-camera photometric loss associated with a multi-camera rig of an ego vehicle. The method also includes generating a self-occlusion mask by manually segmenting self-occluded areas of images captured by the multi-camera rig of the ego vehicle. The method further includes multiplying the multi-camera photometric loss with the self-occlusion mask to form a self-occlusion masked photometric loss. The method also includes training a depth estimation model and an ego-motion estimation model according to the self-occlusion masked photometric loss. The method further includes predicting a 360° point cloud of a scene surrounding the ego vehicle according to the depth estimation model and the ego-motion estimation model.

18 Claims, 10 Drawing Sheets

(51) Int. Cl.

| | |
|---|---|
| *G06T 3/00* | (2006.01) |
| *G05D 1/02* | (2020.01) |
| *G06N 3/08* | (2023.01) |
| *G06T 7/579* | (2017.01) |
| *G06T 7/292* | (2017.01) |
| *G06T 7/11* | (2017.01) |
| *B60W 60/00* | (2020.01) |
| *G06T 3/40* | (2006.01) |
| *G06F 18/214* | (2023.01) |
| *H04N 23/90* | (2023.01) |

(52) U.S. Cl.
CPC ......... *G05D 1/0212* (2013.01); *G05D 1/0246* (2013.01); *G06F 18/214* (2023.01); *G06F 18/2148* (2023.01); *G06N 3/08* (2013.01); *G06T 3/0012* (2013.01); *G06T 3/0093* (2013.01); *G06T 3/40* (2013.01); *G06T 7/11* (2017.01); *G06T 7/292* (2017.01); *G06T 7/579* (2017.01); *H04N 23/90* (2023.01); *B60R 2300/102* (2013.01); *B60W 2420/42* (2013.01); *G05D 2201/0213* (2013.01); *G06T 2207/10028* (2013.01); *G06T 2207/20081* (2013.01); *G06T 2207/20084* (2013.01); *G06T 2207/30244* (2013.01); *G06T 2207/30252* (2013.01)

(58) Field of Classification Search
CPC .......... G06T 7/579; G06T 2207/10028; G06T 2207/20081; G06T 2207/20084; G06T 2207/30244; G06T 2207/30252; B60R 1/00; B60R 2300/102; B60W 60/001; B60W 2420/42; G05D 1/0212; G05D 1/0246; G05D 2201/0213; G06F 18/214; G06F 18/2148; G06N 3/08; G06N 3/0464; G06N 3/0895; H04N 23/90; G06V 20/58
See application file for complete search history.

(56) References Cited

U.S. PATENT DOCUMENTS

| | | | |
|---|---|---|---|
| 2019/0356905 A1 | 11/2019 | Godard et al. | |
| 2020/0167941 A1* | 5/2020 | Tong | G06F 18/251 |
| 2022/0237866 A1* | 7/2022 | Stein | G06V 20/56 |
| 2022/0270354 A1* | 8/2022 | Liu | G06T 7/30 |

OTHER PUBLICATIONS

Bertel, et al., "Omniphotos: Casual 360° VR Photography", ACM Transactions on Graphics (TOG), 2020, 39(6):1-12.
Caesar, et al., "nuscenes: A multimodal dataset for autonomous driving", In Proceedings of the IEEE/CVF conference on computer vision and pattern recognition, 2020, pp. 11621-11631.
Chen, et al., "Distortion-aware monocular depth estimation for omnidirectional images", IEEE Signal Processing Letters, 2021.
Bian, et al., "Unsupervised scale-consistent depth and ego-motion learning from monocular video" In Thirty-third Conference on Neural Information Processing Systems (NeurIPS), 2019.
Garg, et al., Unsupervised cnn for single view depth estimation: Geometry to the rescue. In European Conference on Computer Vision, 2016, pp. 740-756.
Geiger, et al., "Are we ready for autonomous driving? the kitti vision benchmark suite", In Computer Vision and Pattern Recognition (CVPR), 2012 IEEE Conference, 2012, pp. 3354-3361.
Godard, et al., "Unsupervised monocular depth estimation with leftright consistency", In Proceedings of the IEEE Conference on Computer Vision and Pattern Recognition, 2017, pp. 270-279.
Godard, et al., "Digging into self-supervised monocular depth estimation", In Proceedings of the IEEE international conference on computer vision, 2019, pp. 3828-3838.
Gordon, et al., Depth from videos in the wild: Unsupervised monocular depth learning from unknown cameras. In Proceedings of the IEEE/CVF International Conference on Computer Vision, 2019, pp. 8977-8986.
Guizilini, et al., "3d packing for self-supervised monocular depth estimation", In Proceedings of the IEEE/CVF Conference on Computer Vision and Pattern Recognition, 2020, pp. 2485-2494.
Hartley, et al., "Multiple View Geometry in Computer Vision", Cambridge University Press, 2003.
Huang, et al., "Deepmvs: Learning Multi-View Stereopsis", In Proceedings of the IEEE Conference on Computer Vision and Pattern Recognition, 2018, pp. 2821-2830.
Im, et al., "Dpsnet: End-to-end deep plane sweep stereo", arXiv:1905.00538, 2019.
Jaderberg, et al., "Spatial transformer networks", arXiv:1506.02025, 2015.
Kar, et al., "Learning a multi-view stereo machine", arXiv:1708.05375, 2017.
Karakottas, et al., "360° surface regression with a hypersphere loss", In 2019 IEEE International Conference on 3D Vision (3DV), 2019, pp. 258-268.
Kendall, et al., "Posenet: A convolutional network for real-time 6-dof camera relocalization", In Proceedings of the IEEE International Conference on Computer Vision, 2015, pp. 2938-2946.
Khot, et al., "Learning unsupervised multi-view stereopsis via robust photometric consistency", arXiv:1905.02706, 2019.
Klodt, et al., "Supervising the new with the old: learning sfm from sfm", In Proceedings of the European Conference on Computer Vision (ECCV), 2018, pp. 698-713.
Kuznietsov, et al., "Semisupervised deep learning for monocular depth map prediction", In Proceedings of the IEEE Conference on Computer Vision and Pattern Recognition, pp. 6647-6655, 2017.
Brown, et al., "Advances in computational stereo", IEEE transactions on pattern analysis and machine intelligence, 25(8):993-1008, 2003.
Li, et al., "Megadepth: Learning single-view depth prediction from Internet photos", In Proceedings of the IEEE Conference on Computer Vision and Pattern Recognition, 2018, pp. 2041-2050.
Luo, et al., "Attention-aware multi-view stereo", In Proceedings of the IEEE/CVF Conference on Computer Vision and Pattern Recognition, 2020, pp. 1590-1599.
Silberman, et al., "Indoor segmentation and support inference from rgbd images", In Proceedings of the European Conference on Computer Vision (ECCV), 2012.
Pillai, et al., "Superdepth: Self-supervised, super-resolved monocular depth estimation", In IEEE International Conference on Robotics and Automation (ICRA), May 2019.
Eigen, et al., "Depth map prediction from a single image using a multi-scale deep network", arXiv preprint arXiv:1406.2283, 2014.
Saxena, et al., "Depth estimation using monocular and stereo cues", In International Joint Conference on Artificial Intelligence (IJCAI), 2007, vol. 7, pp. 2197-2203.
Saxena, et al., "Make3d: Learning 3d scene structure from a single still image", IEEE Transactions on Pattern Analysis and Machine Intelligence, 2008, 31(5):824-840.
Schonberger, et al., "Structurefrom-motion revisited", In Proceedings of the IEEE Conference on Computer Vision and Pattern Recognition, 2016, pp. 4104-4113.
Sharma, et al., "Unsupervised learning of depth and ego-motion from cylindrical panoramic video", In 2019 IEEE International Conference on Artificial Intelligence and Virtual Reality (AIVR), pp. 58-587.
Vasiljevic, et al., "Neural ray surfaces for self-supervised learning of depth and ego-motion", arXiv:2008.06630, 2020.
Wang, et al., "Bifuse: Monocular 360 depth estimation via bi-projection fusion", In Proceedings of the IEEE/CVF Conference on Computer Vision and Pattern Recognition, 2020, pp. 462-471.
Wang, et al., "360sd-net: 360° stereo depth estimation with learnable cost volume", In 2020 IEEE International Conference on Robotics and Automation (ICRA), pp. 582-588.

(56) References Cited

OTHER PUBLICATIONS

Wang, et al., "Pseudo-LiDAR from visual depth estimation: Bridging the gap in 3d object detection for autonomous driving", In Proceedings of the IEEE Conference on Computer Vision and Pattern Recognition, 2019, pp. 8445-8453.

Wang, et al. "Image quality assessment: from error visibility to structural similarity", IEEE Transactions on image processing, 2004, 13(4):600-612.

Won, et al., "End-to-end learning for omnidirectional stereo matching", In Proceedings of the IEEE/CVF International Conference on Computer Vision, 2019, pp. 8987-8996.

Xue, et al., "Mvscrf: Learning multi-view stereo with conditional random fields", In Proceedings of the IEEE/CVF International Conference on Computer Vision, 2019, pp. 4312-4321.

Zhou, et al., "Unsupervised learning of depth and ego-motion from video", In Proceedings of the IEEE Conference on Computer Vision and Pattern Recognition, 2017, pp. 1851-1858.

Eigen, et al., "Predicting depth, surface normals and semantic labels with a common multi-scale convolutional architecture", In Proceedings of the IEEE international conference on computer vision, pp. 2650-2658, 2015.

Guizilini, et al., "Semantically-guided representation learning for self-supervised monocular depth", In 8th International Conference on Learning Representations (ICLR), Apr. 26-30, 2020.

Kendall, et al., "End-to-end learning of geometry and context for deep stereo regression", In Proceedings of the IEEE International Conference on Computer Vision, pp. 66-75, 2017.

Klingner, et al., "Self-supervised monocular depth estimation: Solving the dynamic object problem by semantic guidance", In European Conference on Computer Vision, pp. 582-600. Springer, 2020.

Li, et al., Undeepvo: Monocular visual odometry through unsupervised deep learning. In 2018 IEEE international conference on robotics and automation (ICRA), pp. 7286-7291, IEEE, 2018.

Mahjourian, et al., "Unsupervised learning of depth and ego-motion from monocular video using 3d geometric constraints", In Proceedings of the IEEE Conference on Computer Vision and Pattern Recognition, pp. 5667-5675, 2018.

Wang, et al., "Unos: Unified unsupervised optical-flow and stereo-depth estimation by watching videos", In Proceedings of the IEEE/CVF Conference on Computer Vision and Pattern Recognition, pp. 8071-8081, 2019.

Zbontar, et al., "Stereo matching by training a convolutional neural network to compare image patches", J. Mach. Learn. Res., 17(1):2287-2318, 2016.

Zhan, et al., "Unsupervised learning of monocular depth estimation and visual odometry with deep feature reconstruction", In Proceedings of the IEEE Conference on Computer Vision and Pattern Recognition, pp. 340-349, 2018.

Kendall, et al., "Geometric loss functions fro camera ose regression with deep learning," In Proceedings of the IEEE International Conference on Computer Vision, pp. 66-75, 2017.

* cited by examiner

FIG. 9A (a) Input RGB image.
FIG. 9B (b) Self-occlusion mask.
FIG. 9C (c) Without self-occlusion masking.
FIG. 9D (d) With self-occlusion masking.

SELF-OCCLUSION MASKS TO IMPROVE SELF-SUPERVISED MONOCULAR DEPTH ESTIMATION IN MULTI-CAMERA SETTINGS

CROSS-REFERENCE TO RELATED APPLICATION

The present application claims the benefit of U.S. Provisional Patent Application No. 63/161,614, filed Mar. 16, 2021, and titled "SCALE-AWARE DEPTH ESTIMATION USING MULTI-CAMERA PHOTOMETRIC LOSS," the disclosure of which is expressly incorporated by reference herein it its entirety.

BACKGROUND

Field

Certain aspects of the present disclosure generally relate to machine learning and, more particularly, a system and method for self-occlusion masks to improve self-supervised monocular depth estimation in multi-camera settings.

Background

Autonomous agents rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision is distinct from the field of digital image processing because of the desire to recover a three-dimensional (3D) structure of the world from images and using the 3D structure for fully understanding a scene. That is, machine vision strives to provide a high-level understanding of a surrounding environment, as performed by the human visual system.

An ego vehicle may rely on a trained convolutional neural network (CNN) to identify a depth of objects within areas of interest in an image of a surrounding scene of the ego vehicle. For example, a CNN may be trained to identify a depth of objects captured by sensors, such as light detection and ranging (LIDAR) sensors, sonar sensors, red-green-blue (RGB) cameras, RGB-depth (RGB-D) cameras, and the like. The sensors may be in communication with a device, such as the ego vehicle.

Conventional self-supervised methods for depth estimation focus on forward-facing cameras, which are generally mounted in a manner that reduces and/or precludes self-occlusion. For most autonomous driving camera rigs, however, side-facing cameras and rear-facing cameras may exhibit significant self-occlusions due to a body of the vehicle. These self-occlusions are especially problematic when the cameras are placed on a streamlined roof rack for the purpose of esthetics, aerodynamics, or ease of production. These self-occluded areas, however, exhibit no relative motion and, therefore, are not useful in the context of self-supervised depth or ego-motion learning.

SUMMARY

A method for self-supervised depth and ego-motion estimation is described. The method includes determining a multi-camera photometric loss associated with a multi-camera rig of an ego vehicle. The method also includes generating a self-occlusion mask by manually segmenting self-occluded areas of images captured by the multi-camera rig of the ego vehicle. The method further includes multiplying the multi-camera photometric loss with the self-occlusion mask to form a self-occlusion masked photometric loss. The method also includes training a depth estimation model and an ego-motion estimation model according to the self-occlusion masked photometric loss. The method further includes predicting a 360° point cloud of a scene surrounding the ego vehicle according to the depth estimation model and the ego-motion estimation model.

A non-transitory computer-readable medium having program code recorded thereon for self-supervised depth and ego-motion estimation is described. The program code is executed by a processor. The non-transitory computer-readable medium includes program code to determine a multi-camera photometric loss associated with a multi-camera rig of an ego vehicle. The non-transitory computer-readable medium also includes program code to generate a self-occlusion mask by manually segmenting self-occluded areas of images captured by the multi-camera rig of the ego vehicle. The non-transitory computer-readable medium further includes program code to multiply the multi-camera photometric loss with the self-occlusion mask to form a self-occlusion masked photometric loss. The non-transitory computer-readable medium also includes program code to train a depth estimation model and an ego-motion estimation model according to the self-occlusion masked photometric loss. The non-transitory computer-readable medium further includes program code to predict a 360° point cloud of a scene surrounding the ego vehicle according to the depth estimation model and the ego-motion estimation model.

A system for self-supervised depth and ego-motion estimation is described. The system includes a multi-camera photometric loss module to determine a multi-camera photometric loss associated with a multi-camera rig of an ego vehicle. The system also includes a self-occlusion masking module to generate a self-occlusion mask by manually segmenting self-occluded areas of images captured by the multi-camera rig of the ego vehicle and to multiply the multi-camera photometric loss with the self-occlusion mask to form a self-occlusion masked photometric loss. The system further includes a depth and ego motion training module to train a depth estimation model and an ego-motion estimation model according to the self-occlusion masked photometric loss. The system also includes a full surround mono-depth (FSM) point cloud module to predict a 360° point cloud of a scene surrounding the ego vehicle according to the depth estimation model and the ego-motion estimation model.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
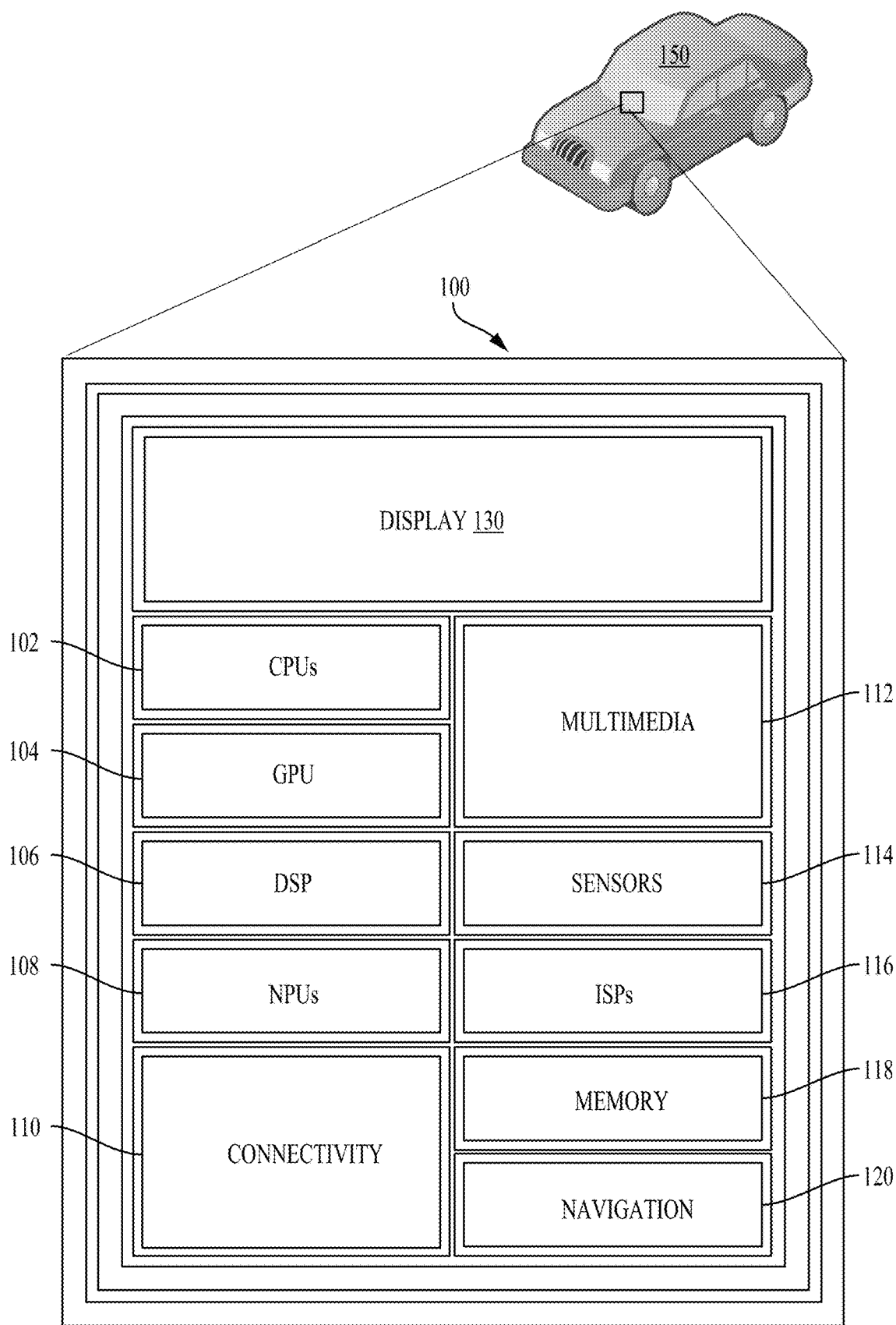
FIG. 1 illustrates an example implementation of designing a system using a system-on-a-chip (SOC) for self-occlusion masks to improve self-supervised depth and ego-motion learning in multi-camera settings, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

The ability to reconstruct the structure of a scene with high accuracy is fundamental to ensuring robust autonomous navigation. Traditional approaches to monocular 3D reconstruction rely on hand-engineered features to reliably reconstruct scenes from camera imagery. More recently, deep learning approaches show considerable promise in eliminating these hand-engineered features for further improving 3D reconstruction. In particular, these deep learning approaches are especially helpful for ill-posed regimes, such as reconstructing textureless regions, or geometrically under-determined regimes.

A known limitation of self-supervised depth and ego-motion models is their limited application to multi-camera settings. In contrast to multi-camera settings, single-camera setups are usually forward-facing, with the camera strategically positioned to reduce self-occlusion and increase an area of coverage. As described, self-occlusion refers to scenarios in which an ego vehicle covers part of a captured image. Nevertheless, when multiple cameras are considered, and especially when the objective is generating a 360° surrounding view of an environment, it is common that the cameras are awkwardly placed in a manner in which a portion of the image is covered by the ego vehicle. This occlusion scenario is unsuitable for self-supervised learning because the awkwardly placed cameras do not contain motion. As a result, a traditional method that is applied in this setting does not converge to meaningful estimates.

Self-supervised learning enables the extraction of information from arbitrarily large amounts of data. Depth is particularly suitable for this task because depth is trained using geometry constraints, such as structure-from-motion in raw video sequences. Unfortunately, conventional self-supervised methods for depth estimation focus on forward-facing cameras, which are generally mounted in a manner that reduces and/or precludes self-occlusion. For most autonomous driving camera rigs, however, side-facing cameras and rear-facing cameras may exhibit significant self-occlusions due to a body of the vehicle. These self-occlusions are especially problematic when the cameras are placed on a streamlined roof rack for the purpose of esthetics, aerodynamics, or ease of production. These self-occluded areas, however, exhibit no relative motion and, therefore, are not useful in the context of self-supervised learning. This issue is similar to the infinite depth problem, in which objects with no relative motion (e.g., cars moving at the same speed as the ego vehicle) result in depth predictions with arbitrarily large depth values.

Conventional solutions address self-occlusions in an automatic manner. For example, one solution uses an auto-masking technique to filter out pixels with synthesized re-projection errors higher than that of the original source image. Another conventional solution filters out a training dataset to remove frames containing objects with no relative motion. These techniques, however, do not properly address the self-occlusion problem. In particular, auto-masking assumes brightness constancy, which is violated in the case of high specularity (e.g., shiny car surfaces). That is, brightness constancy is violated when the body of the car is the self-occlusion, as well as glass and other reflective surfaces. Dataset filtering, on the other hand, removes entire frames from the training split, not portions of the image, which is undesirable because each frame contains the same self-occlusion.

In contrast, aspects of the present disclosure are directed to a hard-coded mask that is generated by manually segmenting self-occluded areas. In particular, because aspects of the present disclosure consider known and fixed extrinsics between cameras, determining which image areas are self-occluded and creating a mask by manually segmenting such areas it is straightforward. In these aspects of the present disclosure, a single mask is generated for each camera and used during training to avoid gradient back-propagation in self-occluded areas. Aspects of the present disclosure mask the photometric loss during training, rather than an input image, such that masking is not performed during test time. The introduction of these self-occlusion masks results in a substantial improvement in overall performance. In particular, the substantial improvement enables the use of self-supervised depth and ego-motion learning under these conditions. In these aspects of the present disclosure, self-occluded areas in the predicted depth maps are correctly "in-painted" to include the hidden ground plane.

Some aspects of the present disclosure are directed vision-based systems to complement or even substitute LIDAR information, which covers an entire surrounding area of an ego vehicle. A single camera is limited to covering a small portion of the surroundings (around 20%) of the ego vehicle. As a result, multiple cameras are specified in order to achieve full coverage of the surroundings of the ego vehicle. Aspects of the present disclosure address one key challenge in self-supervised depth and ego-motion estimation in a multi-camera real-world setting. In these multi-camera real-world settings, hardware design constraints prevent an optimal placement of cameras that avoids self-occlusions. These aspects of the present disclosure involve self-occlusion masks that provide improved results, while enabling self-supervised learning in these multi-camera real-world settings. Beneficially, these self-occlusion masks enable vision-based systems technology advancements in learning-based solutions for autonomous driving.

Some aspects of the present disclosure are directed to a hard-coded binary mask generated by manually segmenting self-occluded areas of images captured by a multi-camera rig. In these aspects of the present disclosure, a hard-coded binary mask is generated for each camera of the multi-camera rig. In one configuration, the hard-coded binary mask is composed of a grid with the same resolution as the image. For example, the hard-coded binary mask containing ones (white) where there is no self-occlusion, and zeros (black) when there are self-occlusions. These hard-coded binary masks may be used during training to avoid gradient back-propagation in self-occluded areas of images, by multiplying a photometric loss with the hard-coded binary masks.

For example, where there are zeros (e.g., self-occlusion) in the hard-coded binary mask, a gradient is nullified and not taken into consideration. Conversely, where there are ones (e.g., no self-occlusion) in the hard-coded binary mask, the gradients are untouched and remain the same during back-propagation. In these aspects of the present disclosure, the photometric loss is masked rather than the input image. In addition, no masking is performed at test time. The introduction of these self-occlusion masks results in a substantial improvement in overall performance. In particular, these self-occlusion masks enable self-supervised depth and ego-motion learning under these conditions.

Aspects of the present disclosure enable self-supervised depth and ego-motion learning in a multi-camera setting. As noted above, a known limitation of self-supervised depth and ego-motion models is their limited application to multi-camera settings. By contrast, aspects of the present disclosure are directed to using hard-coded masks to avoid back-propagation of network gradients during training, which is sufficient to enable self-supervised training and provide significantly improved results.

FIG. 1 illustrates an example implementation of the aforementioned system and method for self-occlusion masks to improve self-supervised depth and ego-motion learning in multi-camera settings using a system-on-a-chip (SOC) 100 of an ego vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, classify and categorize semantic keypoints of objects in an area of interest, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system (GPS).

The SOC 100 may be based on an Advanced Risk Machine (ARM) instruction set or the like. In another aspect of the present disclosure, the SOC 100 may be a server computer in communication with the ego vehicle 150. In this arrangement, the ego vehicle 150 may include a processor and other features of the SOC 100. In this aspect of the present disclosure, instructions loaded into a processor (e.g., CPU 102) or the NPU 108 of the ego vehicle 150 may include code for monocular visual odometry in an image captured by the sensor processor 114. The instructions loaded into a processor (e.g., CPU 102) may also include code for planning and control (e.g., intention prediction of the ego vehicle) in response to detecting ego-motion of the ego vehicle based on an image captured by the sensor processor 114.

Figure 2:
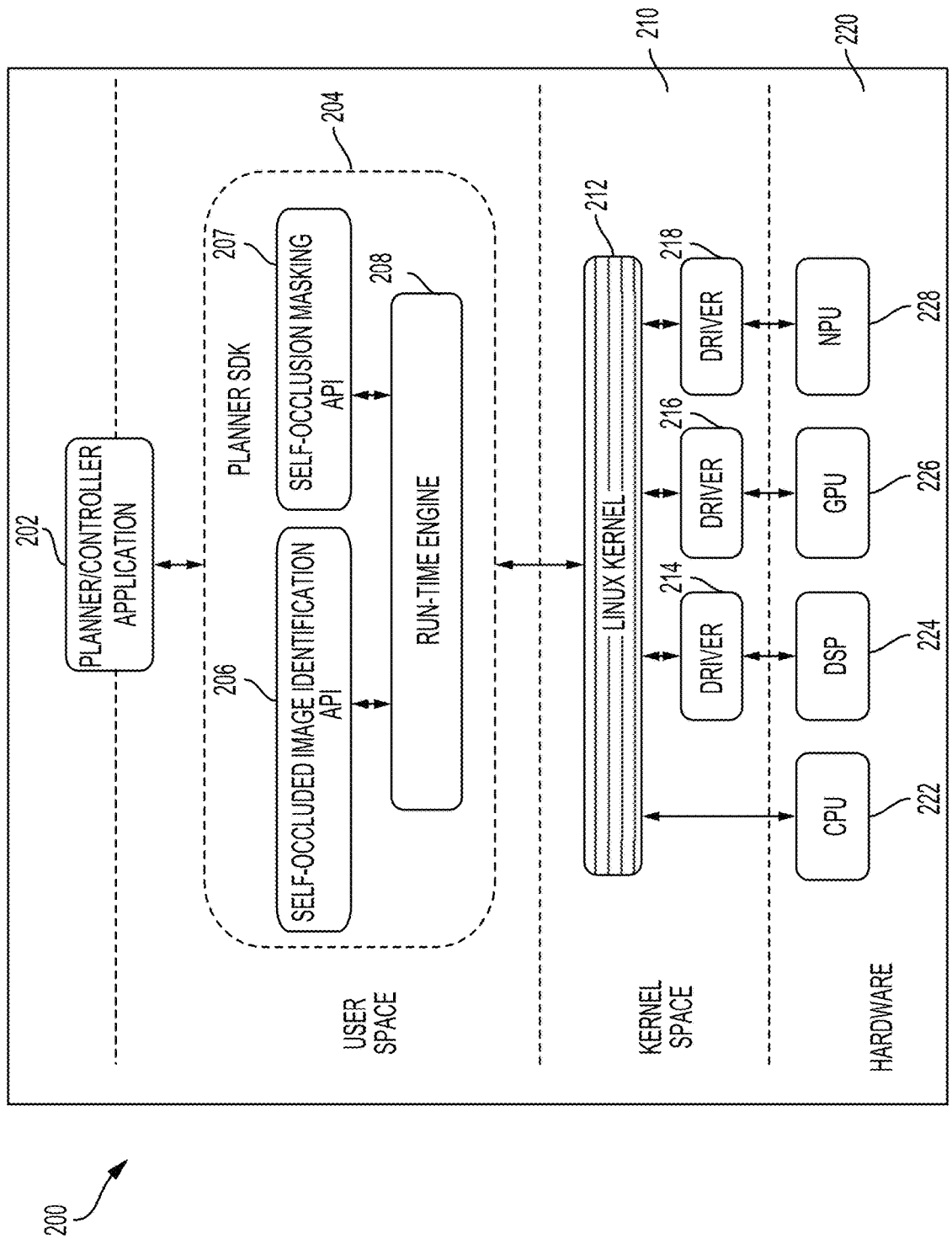
FIG. 2 is a block diagram illustrating a software architecture that may modularize functions for self-occlusion masks to improve self-supervised depth and ego-motion learning in multi-camera settings, according to aspects of the present disclosure.

FIG. 2 is a block diagram illustrating a software architecture 200 that may modularize functions for self-occlusion masks to improve self-supervised depth and ego-motion learning in multi-camera settings, according to aspects of the present disclosure. Using the architecture, a planner/controller application 202 is designed to cause various processing blocks of a system-on-a-chip (SOC) 220 (for example a CPU 222, a DSP 224, a GPU 226, and/or an NPU 228) to perform supporting computations during run-time operation of the planner/controller application 202.

The planner/controller application 202 may be configured to call functions defined in a user space 204 that may, for example, provide for self-occlusion masks to improve self-supervised depth and ego-motion learning using a multi-camera rig of an ego vehicle. The planner/controller application 202 may make a request to compile program code associated with a library defined in a self-occluded image identification application programming interface (API) 206 for detecting self-occluded images. The planner/controller application 202 may make a request to compile program code associated with a library defined in a self-occlusion masking API 207 for the task of multiplying the photometric loss associated with the images captured by the multi-camera rig of the ego vehicle with the self-occlusion mask. The planner/controller application 202 may be configured to a vehicle control action by planning a trajectory of the ego vehicle according to a 360° point cloud of the scene surrounding the ego vehicle.

A run-time engine 208, which may be compiled code of a runtime framework, may be further accessible to the planner/controller application 202. The planner/controller application 202 may cause the run-time engine 208, for example, to perform depth and ego-motion estimation of objects in subsequent frames of a multi-camera video stream. When an object is detected within a predetermined distance of the ego vehicle, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
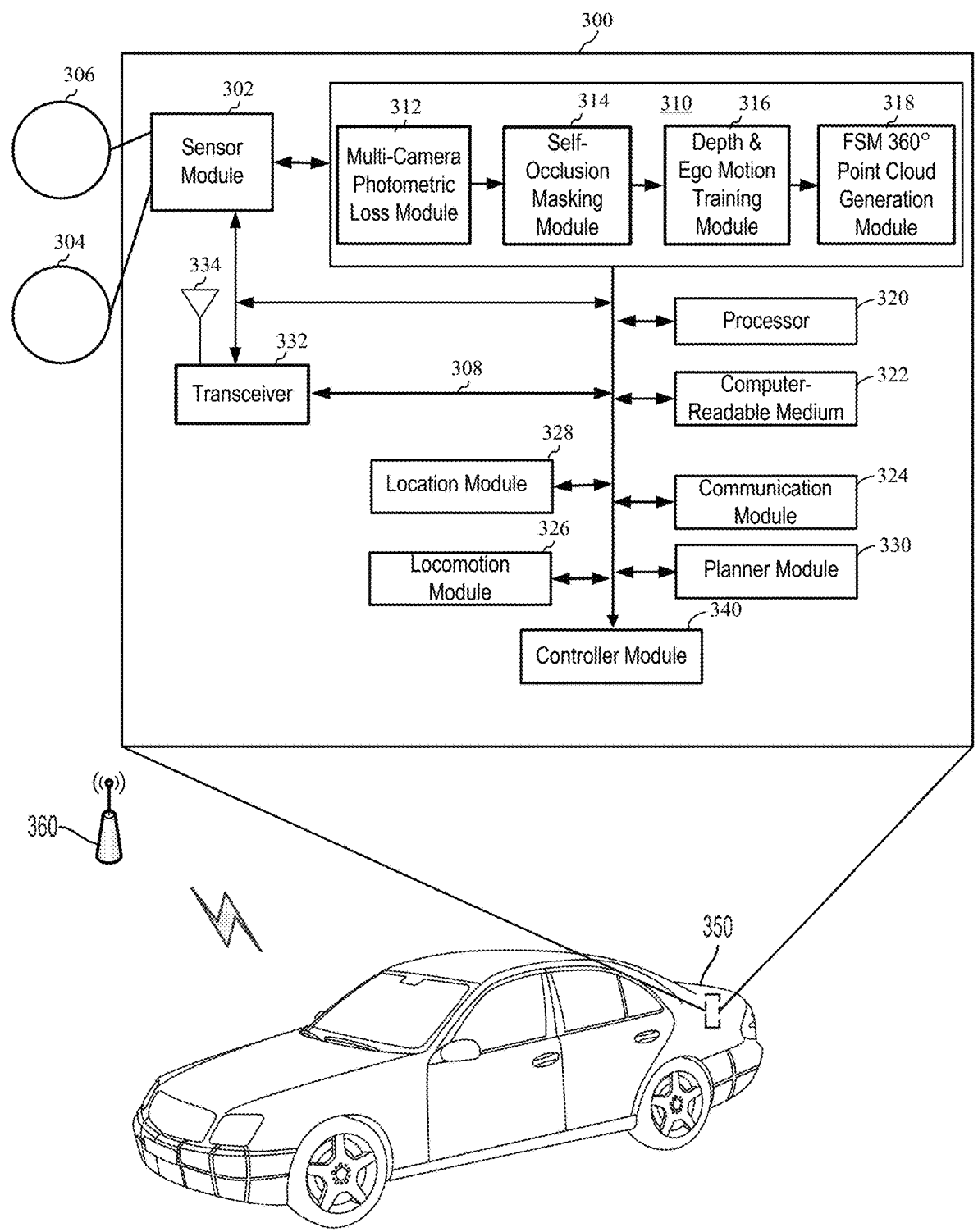
FIG. 3 is a diagram illustrating an example of a hardware implementation for self-occlusion masks to improve self-supervised depth and ego-motion learning in multi-camera settings, according to aspects of the present disclosure.

FIG. 3 is a diagram illustrating an example of a hardware implementation for a depth and ego-motion estimation system 300 to form a full surround mono-depth (FSM) 360° point cloud, according to aspects of the present disclosure. The depth and ego-motion estimation system 300 may be configured for planning and control of an ego vehicle using an FSM 360° point cloud from frames of multi-camera video stream captured during operation of a car 350. The depth and ego-motion estimation system 300 may be a component of a vehicle, a robotic device, or other device. For example, as shown in FIG. 3, the depth and ego-motion estimation system 300 is a component of the car 350. Aspects of the present disclosure are not limited to the depth and ego-motion estimation system 300 being a component of the car 350, as other devices, such as a bus, motorcycle, or other like vehicle, are also contemplated for using the depth and ego-motion estimation system 300. The car 350 may be autonomous or semi-autonomous.

The depth and ego-motion estimation system 300 may be implemented with an interconnected architecture, represented generally by an interconnect 308. The interconnect 308 may include any number of point-to-point interconnects, buses, and/or bridges depending on the specific application of the depth and ego-motion estimation system 300 and the overall design constraints of the car 350. The interconnect 308 links together various circuits including one or more processors and/or hardware modules, represented by a sensor module 302, an ego perception module 310, a processor 320, a computer-readable medium 322, communication module 324, a locomotion module 326, a location module 328, a planner module 330, and a controller module 340. The interconnect 308 may also link various other circuits such as timing sources, peripherals, voltage regulators, and power management circuits, which are well known in the art, and therefore, will not be described any further.

The depth and ego-motion estimation system 300 includes a transceiver 332 coupled to the sensor module 302, the ego perception module 310, the processor 320, the computer-readable medium 322, the communication module 324, the locomotion module 326, the location module 328, a planner module 330, and the controller module 340. The transceiver 332 is coupled to an antenna 334. The transceiver 332 communicates with various other devices over a transmission medium. For example, the transceiver 332 may receive commands via transmissions from a user or a remote device. As discussed herein, the user may be in a location that is remote from the location of the car 350. As another example, the transceiver 332 may transmit the FSM 360° point cloud and/or planned actions from the ego perception module 310 to a server (not shown).

The depth and ego-motion estimation system 300 includes the processor 320 coupled to the computer-readable medium 322. The processor 320 performs processing, including the execution of software stored on the computer-readable medium 322. to provide FSM 360° point cloud functionality, according to aspects of the present disclosure. The software, when executed by the processor 320, causes the depth and ego-motion estimation system 300 to perform the various functions described for ego vehicle perception based on self-occlusion masked depth and ego-motion estimation from video captured by a multi-camera rig of an ego vehicle, such as the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain images via different sensors, such as a first sensor 304 and a second sensor 306. The first sensor 304 may be a vision sensor (e.g., a stereoscopic camera or a red-green-blue (RGB) camera) for capturing 2D RGB images. The second sensor 306 may be a ranging sensor, such as a light detection and ranging (LIDAR) sensor or a radio detection and ranging (RADAR) sensor. Of course, aspects of the present disclosure are not limited to the aforementioned sensors, as other types of sensors (e.g., thermal, sonar, and/or lasers) are also contemplated for either of the first sensor 304 or the second sensor 306.

The images of the first sensor 304 and/or the second sensor 306 may be processed by the processor 320, the sensor module 302, the ego perception module 310, the communication module 324, the locomotion module 326, the location module 328, and the controller module 340. In conjunction with the computer-readable medium 322, the images from the first sensor 304 and/or the second sensor 306 are processed to implement the functionality described herein. In one configuration, detected 3D object information captured by the first sensor 304 and/or the second sensor 306 may be transmitted via the transceiver 332. The first sensor 304 and the second sensor 306 may be coupled to the car 350 or may be in communication with the car 350.

The location module 328 may determine a location of the car 350. For example, the location module 328 may use a global positioning system (GPS) to determine the location of the car 350. The location module 328 may implement a dedicated short-range communication (DSRC)-compliant GPS unit. A DSRC-compliant GPS unit includes hardware and software to make the car 350 and/or the location module 328 compliant with one or more of the following DSRC standards, including any derivative or fork thereof: EN 12253:2004 Dedicated Short-Range Communication—Physical layer using microwave at 5.9 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

A DSRC-compliant GPS unit within the location module 328 is operable to provide GPS data describing the location of the car 350 with space-level accuracy for accurately directing the car 350 to a desired location. For example, the car 350 is driving to a predetermined location and desires partial sensor data. Space-level accuracy means the location of the car 350 is described by the GPS data sufficient to confirm a location of the parking space of the car 350. That is, the location of the car 350 is accurately determined with space-level accuracy based on the GPS data from the car 350.

The communication module 324 may facilitate communications via the transceiver 332. For example, the communication module 324 may be configured to provide communication capabilities via different wireless protocols, such as Wi-Fi, 5G new radio (NR), long term evolution (LTE), 3G, etc. The communication module 324 may also communicate with other components of the car 350 that are not modules of the ego-motion estimation system 300. The transceiver 332 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data, including via short messaging service (SMS), multimedia messaging service (MMS), hypertext transfer protocol (HTTP), direct data connection, wireless application protocol (WAP), e-mail, DSRC, full-duplex wireless communications, mmWave, Wi-Fi (infrastructure mode), Wi-Fi (ad-hoc mode), visible light communication, TV white space communication, and satellite communication. The network access point 360 may also include a mobile data network that may include third generation (3G), fourth generation (4G), fifth generation (5G), long term evolution (LTE), LTE-vehicle-to-everything (V2X), LTE-driver-to-driver (D2D), Voice over LTE (VoLTE), or any other mobile data network or combination of mobile data networks. Further, the network access point 360 may include one or more IEEE 802.11 wireless networks.

The self-occlusion masked depth and ego-motion estimation system 300 also includes the planner module 330 for planning a selected route/action (e.g., collision avoidance) of the car 350 and the controller module 340 to control the locomotion of the car 350. The controller module 340 may perform the selected action via the locomotion module 326 for autonomous operation of the car 350 along, for example, a selected route. In one configuration, the planner module 330 and the controller module 340 may collectively override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the car 350 is one of the following: a Level 0 non-autonomous vehicle; a Level 1 autonomous vehicle; a Level 2 autonomous vehicle; a Level 3 autonomous vehicle; a Level 4 autonomous vehicle; a Level 5 autonomous vehicle; and an HAV.

The ego perception module 310 may be in communication with the sensor module 302, the processor 320, the computer-readable medium 322, the communication module 324, the locomotion module 326, the location module 328, the planner module 330, the transceiver 332, and the controller module 340. In one configuration, the ego perception module 310 receives sensor data from the sensor module 302. The sensor module 302 may receive the sensor data from the first sensor 304 and the second sensor 306. According to aspects of the present disclosure, the ego perception module 310 may receive sensor data directly from the first sensor 304 or the second sensor 306 to perform monocular ego-motion estimation from images captured by the first sensor 304 or the second sensor 306 of the car 350.

Conventional solutions addressing self-occlusions in images are performed in an automatic manner. For example, one solution uses an auto-masking technique to filter out pixels with synthesized re-projection errors higher than that of the original source image. Another conventional solution filters out a training dataset to remove frames containing objects with no relative motion. These techniques, however, do not properly address the self-occlusion problem. In particular, auto-masking assumes brightness constancy, which is violated in the case of high specularity (e.g., shiny car surfaces). That is, brightness constancy is violated when the body of the car is the self-occlusion, as well as glass and other reflective surfaces. Dataset filtering, on the other hand, removes entire frames from the training split, not portions of the image, which is undesirable because each frame contains the same self-occlusion.

In contrast, aspects of the present disclosure are directed to a hard-coded mask that is generated by manually segmenting self-occluded areas. In particular, because aspects of the present disclosure consider known and fixed extrinsics between cameras, determining which areas are self-occluded and creating a mask by manually segmenting such areas is straightforward. In these aspects of the present disclosure, a single mask is generated for each camera and used during training to avoid gradient back-propagation in self-occluded areas. Aspects of the present disclosure mask the photometric loss during training, rather than an input image, such that masking is not performed during test time. The introduction of these self-occlusion masks results in a substantial improvement in overall performance. In particular, the substantial improvement enables the use of self-supervised depth and ego-motion learning under these conditions. In these aspects of the present disclosure, self-occluded areas in the predicted depth maps are correctly "in-painted" to include the hidden ground plane.

As shown in FIG. 3, the ego perception module 310 includes a multi-camera photometric loss module 312, a self-occlusion masking module 314, a depth and ego-motion training module 316, and a full surround mono-depth (FSM) 360° point cloud generation module 318. The multi-camera photometric loss module 312, the self-occlusion masking module 314, and the depth and ego-motion training module 316 may be components of a same or different artificial neural network. For example, the artificial neural network is a convolutional neural network (CNN) communicably coupled to a multi-camera rig. The ego perception module 310 receives a data stream from the first sensor 304 and/or the second sensor 306. The data stream may include a 2D red-green-blue (RGB) image from the first sensor 304 and/or the second sensor 306. The data stream may include multiple frames, such as image frames. In one configuration, the first sensor 304 and the second sensor 306 are replaced with a multi-camera rig to capture 2D RGB images.

The ego perception module 310 is configured to perform self-occlusion masked depth and ego-motion learning using the self-occlusion masking module 314, and the depth and ego-motion training module 316 for the task of generating a 360° point cloud using the FSM 360° point cloud generation module 318. In one configuration, the multi-camera photometric loss module 312 generates a photometric loss by warping an image obtained by one of multiple cameras onto a viewpoint of another camera of a multi-camera vehicle rig of the car 350. According to aspects of the present disclosure, the multi-camera photometric loss is provided to the self-occlusion masking module 314 to multiply the photometric loss associated with images captured by the multi-camera rig of the car 350 with a corresponding self-occlusion mask. The self-occlusion masking depth and ego-motion estimation system 300 may be configured for planning and control of an ego vehicle using an FSM 360° point cloud from frames of a multi-camera rig during operation of the ego vehicle, for example, as shown in FIG. 4.

Figure 4:
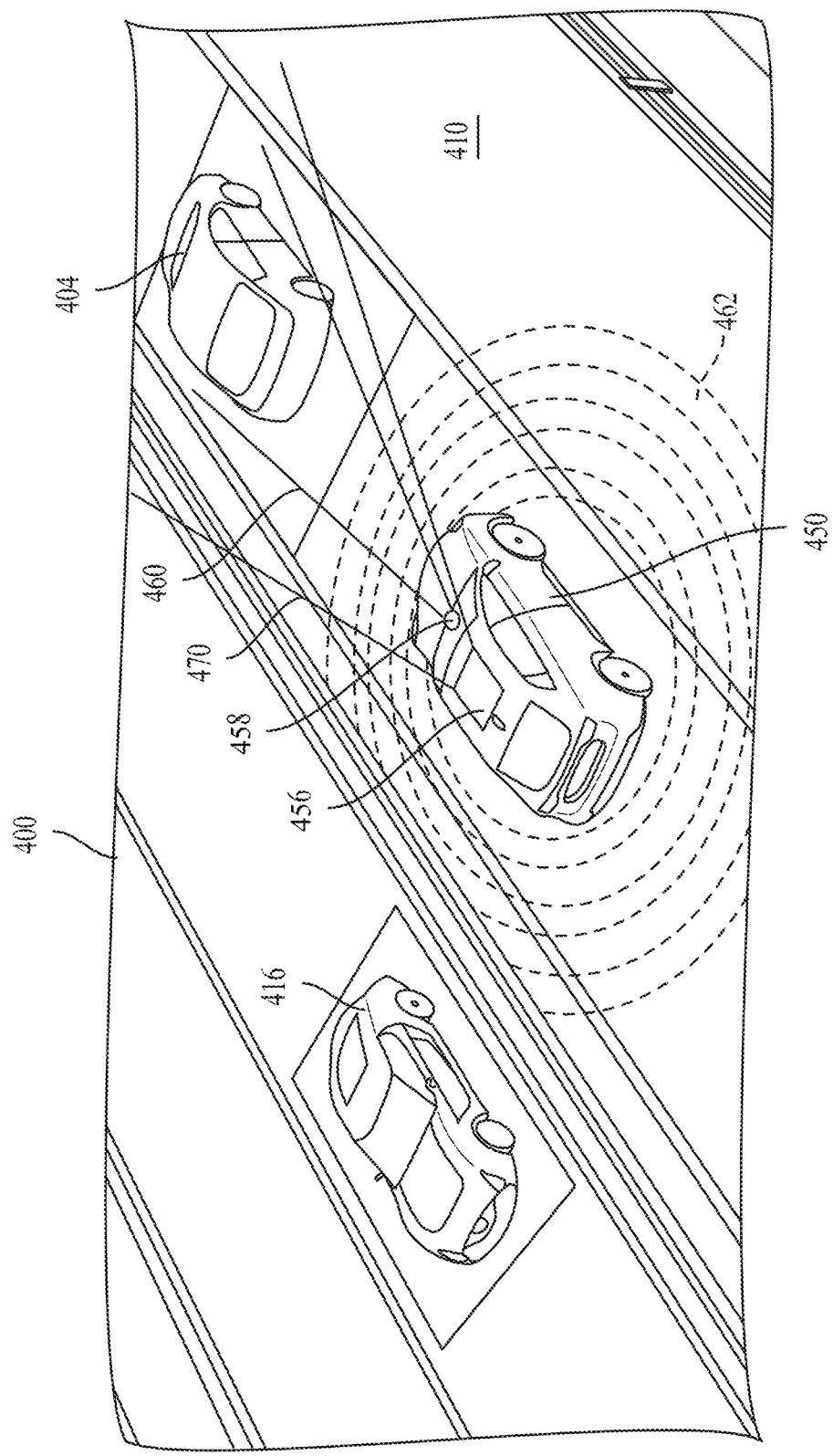
FIG. 4 is a drawing illustrating an example of an ego vehicle in an environment, according to aspects of the present disclosure.

FIG. 4 illustrates an example of an ego vehicle 450 (e.g., the car 350) in an environment 400, according to aspects of the present disclosure. As shown in FIG. 4, the ego vehicle 450 is traveling on a road 410. A first vehicle 404 (e.g., other agent) may be ahead of the ego vehicle 450, and a second vehicle 416 may be adjacent to the ego vehicle 450. In this example, the ego vehicle 450 may include a 2D camera 456, such as a 2D red-green-blue (RGB) camera, and a second sensor 458. The second sensor 458 may be another RGB camera or another type of sensor, such as ultrasound, radio detection and ranging (RADAR), and/or light detection and ranging (LIDAR), as shown by reference number 462. Additionally, or alternatively, the ego vehicle 450 may include one or more additional sensors. For example, the additional sensors may be side facing and/or rear facing sensors.

In one configuration, the 2D camera 456 captures a 2D image that includes objects in the field of view 460 of the 2D camera 456. The second sensor 458 may generate one or more output streams. The 2D image captured by the 2D camera 456 includes a 2D image of the first vehicle 404, as the first vehicle 404 is in the field of view 460 of the 2D camera 456. A field of view 470 of the second sensor 458 is also shown.

The information obtained from the 2D camera 456 and the second sensor 458 may be used to navigate the ego vehicle 450 along a route when the ego vehicle 450 is in an autonomous mode. The 2D camera 456 and the second sensor 458 may be powered from electricity provided from the battery (not shown) of the ego vehicle 450. The battery may also power the motor of the ego vehicle 450. The information obtained from the 2D camera 456 and the second sensor 458 may be used to generate a 3D representation of an environment.

Self-supervised monocular depth and ego-motion estimation provides a promising approach to replace/supplement expensive depth sensors, such as the LIDAR sensors of the ego vehicle 450. In particular, vision-based systems to complement or even substitute LIDAR information, which covers an entire surrounding area of the ego vehicle 450 are desired. In particular, self-supervised learning is a promising tool for 3D perception in autonomous driving, and self-supervised learning is an integral part of modern state-of-the-art depth estimation architectures. Though recently released datasets contain multi-camera data that covers the same full 360° field of view as LIDAR, research has focused on forward-facing cameras. In practice, a single camera is limited to covering a small portion of the surroundings (around 20%) of the ego vehicle 450. As a result, multiple cameras are specified in order to achieve full coverage of the surroundings of the ego vehicle 450.

Aspects of the present disclosure address one key challenge in self-supervised depth and ego-motion estimation in multi-camera real-world settings. In these multi-camera real-world settings, hardware design constraints prevent an optimal placement of cameras that avoids self-occlusions. These aspects of the present disclosure involve self-occlusion masks that provide improved results, while enabling self-supervised learning in these multi-camera real-world settings. Beneficially, these self-occlusion masks enable vision-based systems technology advancements in learning-based solutions for autonomous driving.

Aspects of the present disclosure extend monocular self-supervised depth and ego-motion estimation to large-baseline multi-camera rigs. These aspects of the present disclosure are directed to a hard-coded binary mask generated by manually segmenting self-occluded areas of images captured by a multi-camera rig. In these aspects of the present disclosure, a hard-coded binary mask is generated for each camera of the multi-camera rig. In one configuration, the hard-coded binary mask is composed of a grid with the same resolution as the image. For example, the hard-coded binary mask containing ones (white) where there is no self-occlusion, and zeros (black) when there are self-occlusions. These hard-coded binary masks may be used during training to avoid gradient back-propagation in self-occluded areas of images, by multiplying a photometric loss with the hard-coded binary masks. Aspects of the present disclosure extend self-supervised depth and ego-motion learning to the general multi-camera setting, where cameras can have different intrinsics and reduced overlapping regions. The reduced overlapping regions are specified to reduce the number of cameras on a multi-camera rig while providing a full 360° coverage, for example, as shown in FIG. 5.

Figure 5:
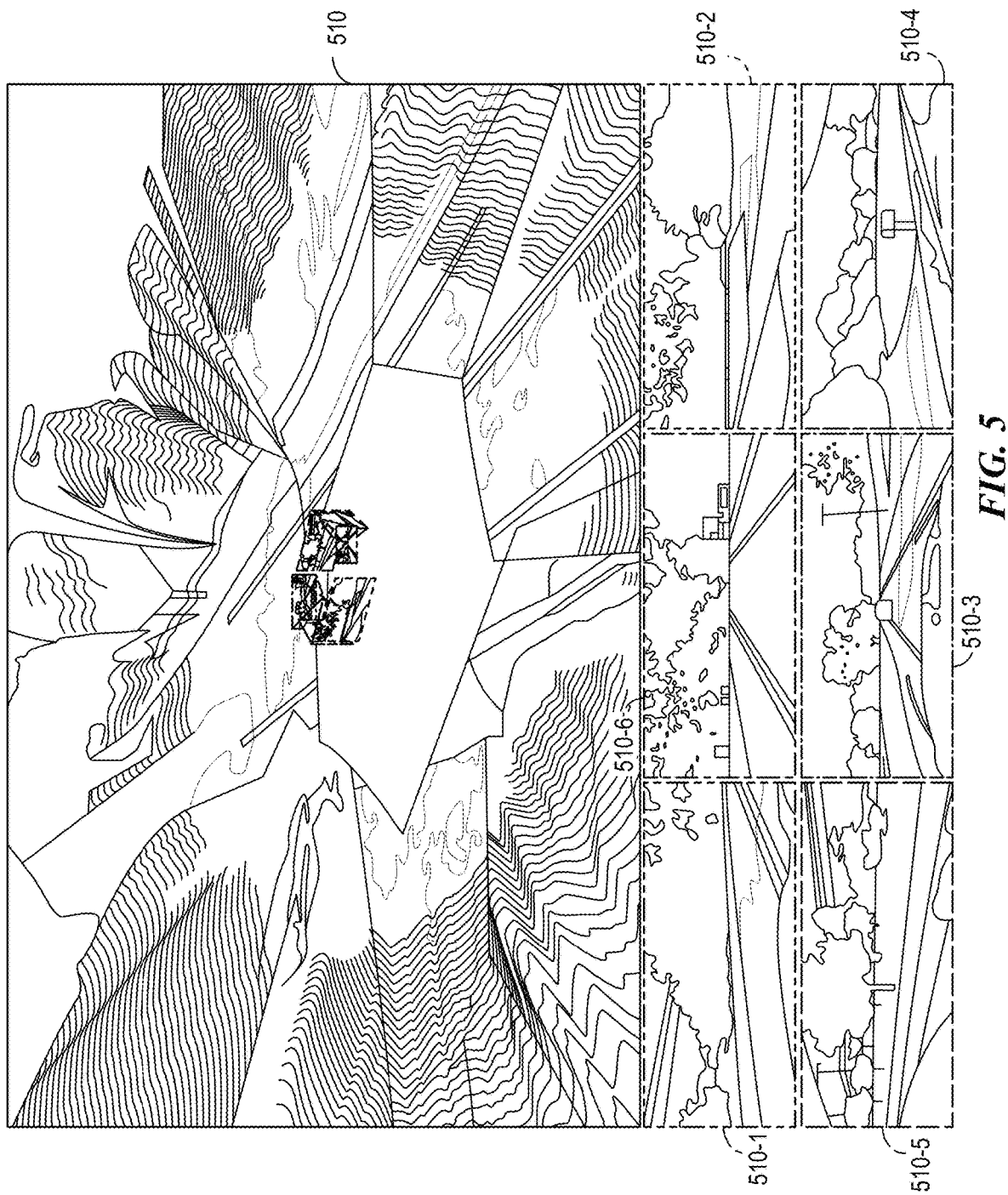
FIG. 5 is a diagram illustrating a full surround monodepth (FSM) point cloud generated using self-supervised learning of consistent depth networks in a wide-baseline 360° multi-camera setting, according to aspects of the present disclosure.

FIG. 5 is a diagram illustrating a full surround mono-depth (FSM) 360° point cloud 500 generated using self-supervised learning of self-occlusion masked photometric loss to train depth and ego-motion networks in a wide-baseline 360° multi-camera setting, according to aspects of the present disclosure. Aspects of the present disclosure leverage cross-camera temporal contexts via spatio-temporal photometric constraints to increase the amount of overlap between cameras using a system's ego-motion. An noted above, a known limitation of self-supervised depth and ego-motion models is their limited application to multi-camera settings. By contrast, aspects of the present disclosure apply hard-coded masks to avoid back-propagation of network gradients during training for enabling self-supervised depth and ego-motion learning in a multi-camera setting with significantly improved results.

In this configuration, the FSM 360° point cloud 500 is generated from images 510 (510-1, 510-2, 510-3, 510-4, 510-5, and 510-6) that capture a scene surrounding an ego vehicle. Although there is minimal overlap between the cameras used to capture the images 510, cross-camera temporal contexts are leveraged via spatio-temporal photometric constraints to increase the amount of overlap between the cameras based on ego-motion. In these aspects of the present disclosure, the FSM 360° point cloud 500 is generated by running depth and ego-motion networks trained using self-occlusion masked multi-camera photometric loss of a multi-camera rig of an ego vehicle, for example, as shown in FIG. 6.

Figure 6:
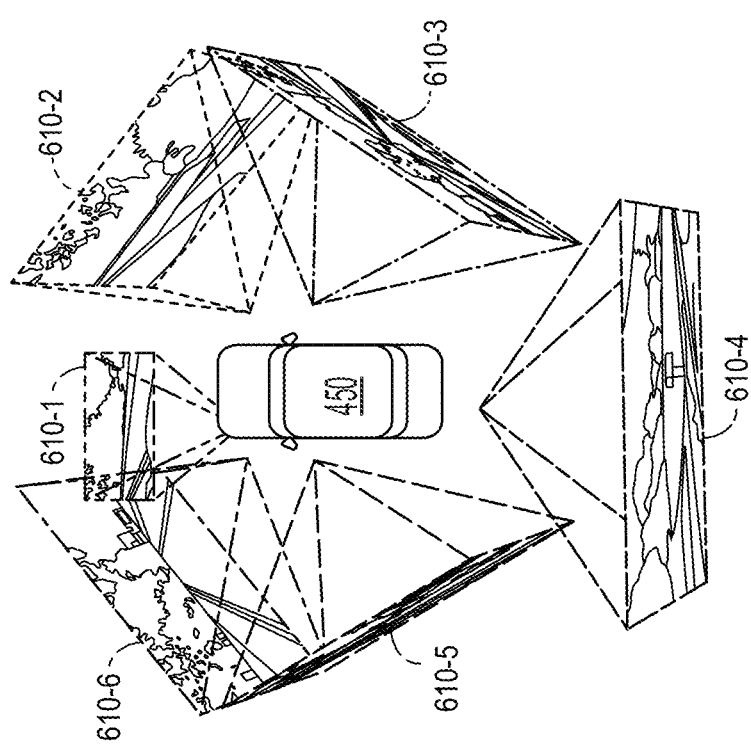
FIG. 6 is a diagram illustrating a distribution of a multi-camera rig of an ego vehicle, with each camera pointing in a different direction to generate a 360° view of an environment surrounding the ego vehicle, according to aspects of the present disclosure.

FIG. 6 is a diagram illustrating a distribution of a multi-camera rig of an ego vehicle 450, with each camera pointing in a different direction to generate a 360° view of an environment surrounding the ego vehicle 450, according to aspects of the present disclosure. In this example, the multi-camera rig 600 is a six-camera rig that captures the images 510 of FIG. 5. This example illustrates red-green-blue (RGB) images (e.g., the images 510) captured by each of the cameras 610 (e.g., 610-1, 610-2, 610-3, 610-4, 610-5, and 610-6) of a multi-camera rig 600 of the ego vehicle 450.

In these aspects of the present disclosure, the cameras 610 capture the images 510 in a particular time-step, including temporal contexts (e.g., a forward frame). In a self-supervised depth and ego-motion setting, both the depth network and the ego-motion network are trained using a self-occlusion masked, multi-camera photometric loss, as shown in FIG. 3. In these aspects of the present disclosure, the multi-camera photometric loss is obtained by warping one of the images 510 obtained by one of the cameras 610 onto a viewpoint of another one of the images 510 obtained by one of the cameras 610 of the multi-camera rig 600.

These aspects of the present disclosure first introduce a base case for monocular self-supervised depth and ego-motion learning, and then extend the description to the proposed multi-camera setting. Self-supervised depth and ego-motion architectures may be composed of a depth network that produces depth maps $\hat{D}_t$ for a target image $I_t$, as well as a pose network that predicts a relative pose for pairs of target t and context c frames. This pose prediction is a rigid transformation according to the following equation:

$$\hat{X}_{t \to c} = \begin{pmatrix} \hat{R}_{t \to c} & \hat{t}_{t \to c} \\ 0 & 1 \end{pmatrix} \in SE(3) \qquad (1)$$

These aspects of the present disclosure jointly train depth and ego-motion networks by reducing a re-projection error between an actual target image $I_t$ and a synthesized image $\hat{I}_t$. The synthesized image $\hat{I}_t$ is subsequently obtained by projecting pixels from a context image $I_c$ (usually preceding or following a target image $I_t$ in a sequence) onto the target image $I_t$. The photometric re-projection loss is composed of the following structure similarity (SSIM) metric and an L1 loss term:

$$\mathcal{L}_p(I_t, \hat{I}_t) = \alpha \frac{1 - SSIM(I_t, \hat{I}_t)}{2} + (1-\alpha)\|I_t - \hat{I}_t\| \qquad (2)$$

Aspects of the present disclosure are directed to reducing the photometric loss according to Equation (2) during training. Reducing the photometric loss according to Equation (2) constrains the depth and pose networks to learn the tasks of depth and pose estimation as a by-product of the geometry of the problem. In particular, image warping involves precise depth and pose knowledge. As a result, reducing the photometric loss is achieved when both the depth and pose networks are generating accurate results. Unfortunately, because the photometric loss is scale-agnostic, the depth and pose networks produce predictions that are accurate up to a factor.

In some aspects of the present disclosure, the target image $I_t$ is view synthesized using a spatial transformer network (STN) via grid sampling in combination with bilinear interpolation. This view synthesis operation is thus fully differentiable, enabling gradient back-propagation for end-to-end training. A pixel warping operation may be defined according to the following equation:

$$\hat{p}_t = \pi(R_{t \to c}\phi(p_t, d_t, K) + t_{t \to c}, K) \qquad (3)$$

where $\phi(p, d, K) = P$ is responsible for the non-projection of an image pixel in homogeneous coordinates p to a 3D point P given its depth value d. Conversely, $\pi(P, K) = p$ projects a 3D point back onto the image plane as a pixel. Both operations involve knowledge of the camera parameters, which for a standard pinhole model are defined by a 3×3 intrinsics matrix K. For convenience, in the remainder of this specification the following abbreviates are used: $\phi i(p, d) = \phi p(p, d, K_i)$ and $\pi_i(P) = \pi(P, K_i)$.

In Equation (3), R represents a rotation matrix between a target camera and context camera, t is the translation vector, p is a pixel with coordinates (u, v) within the image from the context camera, d is the depth value of the pixel, and π and φ are the reconstruction and projection operations. These operations are dependent on the camera model, and for the standard pinhole geometry take the following form:

$$s\begin{bmatrix}u\\v\\1\end{bmatrix} = \begin{bmatrix}f_x & 0 & c_x\\0 & f_y & c_y\\0 & 0 & 1\end{bmatrix}\begin{bmatrix}r_{11} & r_{12} & r_{13} & t_1\\r_{21} & r_{22} & r_{23} & t_2\\r_{31} & r_{32} & r_{33} & t_3\end{bmatrix}\begin{bmatrix}X\\Y\\Z\\1\end{bmatrix} \qquad (4)$$

According to Equation (4), (u, v, 1) are pixel coordinates, (X, Y, Z, 1) are 3D coordinates, and "s" is a scale factor that corresponds to the depth value at that pixel. In this example, two matrices are shown: (1) an intrinsic matrix K; and (2) a transformation matrix. The intrinsic matrix K, contains focal lengths (fx, fy) and principal points ($c_x$, $c_y$). In addition, the transformation matrix positions the camera in a given global frame of reference.

Multi-camera approaches to self-supervised depth and ego-motion are currently restricted to the stereo setting. Although methods have been proposed that combine stereo and monocular self-supervision, directly regressing depth also from stereo pairs, these methods assume the availability of highly-overlapping images. Aspects of the present disclosure differ from the stereo setting by exploiting small overlaps between cameras with arbitrary locations. These aspects of the present disclosure both improve individual camera performance and generate scale-aware models from known extrinsics. Furthermore, multi-camera rigs, such as the multi-camera rig 600 with a low overlap are available. That is, the multi-camera rig 600 provides autonomous driving with a cost-effective solution to 360° vision, as follows.

Let $C^i$ and $C^j$ be two cameras with extrinsics $X^i$ and $X^j$. Denoting the relative extrinsics as $X^{i \to j}$, Equation (3) is used to warp the images from the two cameras:

$$\hat{p}_t^i = \pi(R^{i \to j}\phi(p^i, d^i) + t^{i \to j}) \qquad (5)$$

It is noted that Equation (5) is purely spatial, since it warps images between different cameras taken at the same time-step. Conversely, Equation (3) is purely temporal, since it is only concerned with warping images from the same camera taken at different time-steps. Therefore, for any given camera Ci at a time-step t, a context image can be either temporal (e.g., from adjacent frames t-1 and t+1) or spatial (e.g., from any camera j that overlaps with the camera Ci). The concept of "context image" in self-supervised learning is further generalized to include temporal contexts from other overlapping cameras. According to aspects of the present disclosure, combining spatial and temporal contexts in a context image is performed by warping images between different cameras taken at different time-steps using a composition of known extrinsics with predicted ego-motion:

$$\hat{p}_t^i = \pi(R^{i \to j}(\hat{R}_{t \to c}^j \phi(p_t^j, d_t^j) + t^{i \to j}) \qquad (6)$$

Figure 7:
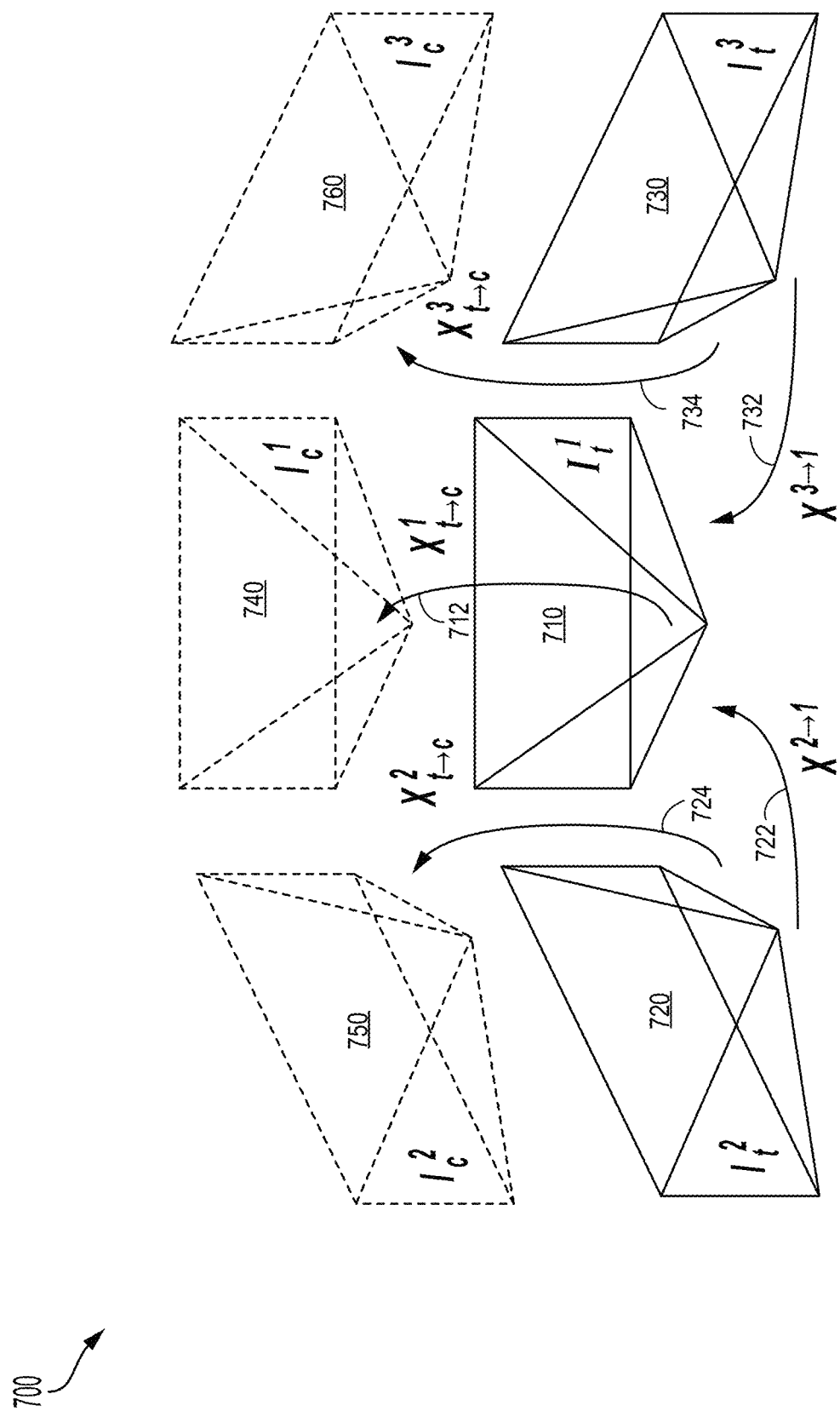
FIG. 7 is a diagram illustrating multi-camera spatio-temporal transformation matrices to enable warping of images between different cameras taken at different timesteps, according to aspects of the present disclosure.

FIG. 7 is a diagram 700 illustrating multi-camera spatio-temporal transformation matrices to enable warping of images between different cameras taken at different time-steps, according to aspects of the present disclosure. In these examples, transformations are performed between target images $I_t$ (e.g., current frames) and context images L (e.g., adjacent frames). For example, spatial transformations ($X^{i \to 1}$) are obtained from known extrinsics, and temporal transformations ($\hat{X}_{t \to c}^i$) are obtained from a pose network. The target images include a first target image 710, a second target image 720, and a third target image 730. In addition, the context images include a first context image 740, a second context image 750, and a third context image 760.

In this example, a first spatial transformation 722 is performed between the second target image 720 and the first target image 710, and a second spatial transformation 732 is performed between the third target image 730 and the first target image 710. In addition, a first temporal transformation 712 is performed between the first target image 710 and the first context image 740. In addition, a second temporal transformation 724 is performed between the second target image 720 and the second context image 750, and a third temporal transformation 734 is performed between the third target image 730 and the third context image 760. Combining spatial and temporal contexts is performed by warping images between different cameras taken at different time-steps using a composition of known extrinsics with predicted ego-motion, for example, as shown in FIG. 8.

Figure 8:
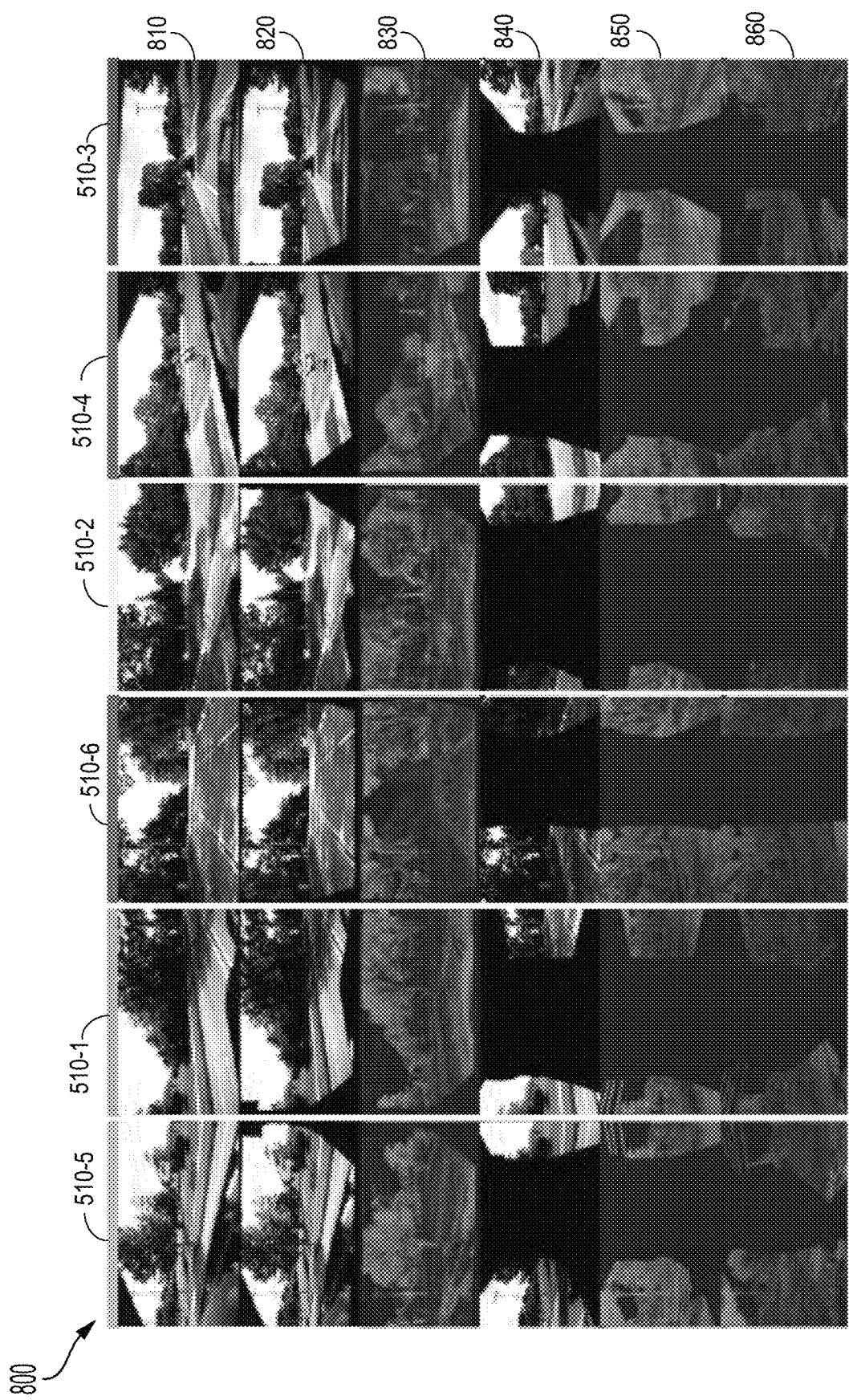
FIG. 8 is a drawing illustrating image warping for spatial and temporal contexts to generate a multi-camera photometric loss, according to aspects of the present disclosure.

FIG. 8 is a drawing illustrating image warping for spatial and temporal contexts to generate a multi-camera photometric loss, according to aspects of the present disclosure. In the drawings 800 of FIG. 8, a first row 810 illustrates input RGB images, which are composed of the images 510 (510-1, 510-2, 510-3, 510-4, 510-5, and 510-6) in a clockwise direction of FIG. 5 that capture the scene surrounding the ego vehicle 450. In this example, a fifth image 510-5 is shown in a first column, a first image 510-1 is shown in a second column, and a sixth image 510-6 is shown in a third column of the drawings 800. In addition, a second image 510-2 is shown in a fourth column, a fourth image 510-4 is shown in a fifth column, and a third image 510-3 is shown in a sixth and final column of the drawings 800.

In these aspects of the present disclosure, a second row 820 illustrates warped versions of the images 510 according to a temporal context of Equation (3), and a third row 830 illustrates a corresponding photometric loss according to Equation (1). A fourth row 840 illustrates synthesized views from surrounding cameras according to a spatial context of Equation (5), and a fifth row 850 illustrates a corresponding photometric loss according to Equation (1) based on a purely spatial context. A sixth row 860 illustrates a spatial-temporal photometric loss according to Equation (6). Aspects of the present disclosure generate larger overlap between images, as well as a smaller residual photometric error for optimization by leveraging temporal contexts during cross-camera photometric warping.

In these aspects of the present disclosure, FIG. 8 shows examples of warped images and corresponding photometric losses based on the images 510 of FIG. 5. Particularly, the fifth row 850 and the sixth row 860 show examples of multi-camera photometric losses using purely spatial contexts (Equation (5)) and spatio-temporal contexts (Equation (6)). As shown in the drawings 800 of FIG. 8, spatio-temporal contexts (STC) promote a larger overlapping area between cameras and smaller residual photometric loss, due to occlusions and changes in brightness and viewpoint. This improved photometric loss beneficially leads to better self-supervision for depth and ego-motion learning in a multi-camera setting.

These aspects of the present disclosure, however, consider the photometric loss between cameras in a same time-step, in addition to between the same camera in different time-steps. As a result, this spatio-temporal context information is encoded into the photometric loss definition. Therefore, this spatio-temporal context information is learned as part of an optimization process of the depth and pose networks. It should be recognized that an overlap between the cameras 610 in the same time-step is much smaller than the overlap between the same camera in subsequent time-steps, as shown in the second row 820 and the fourth row 840 of FIG. 8. Nevertheless, this smaller amount of overlap is sufficient to constrain learning and generate scale-aware models without explicit supervision, in the form of ground-truth depth maps or pose values.

tometric loss ("Mono"). In Table 1, the results are scaled and do not involve correction at test time. As illustrated by the results of Table 1, the corresponding point clouds are consistent with each other (e.g., have a same metric scale), producing a single point cloud that covers an entire area surrounding the ego vehicle.

Some aspects of the present disclosure multiply a photometric loss associated with images captured by a multi-camera rig of an ego vehicle with a self-occlusion mask that is generated by manually segmenting self-occluded image areas. In particular, because aspects of the present disclosure consider known and fixed extrinsics between cameras, determining which image areas are self-occluded and creating a mask by manually segmenting such areas is straightforward. In these aspects of the present disclosure, a single mask is generated for each camera and used during training to avoid gradient back-propagation in self-occluded areas.

Aspects of the present disclosure mask the photometric loss during training, rather than an input image, such that masking is not performed during test time. The introduction of these self-occlusion masks results in a substantial improvement in overall performance. In particular, the substantial improvement enables the use of self-supervised depth and ego-motion learning under these conditions. In these aspects of the present disclosure, self-occluded areas in the predicted depth maps are correctly "in-painted" to include the hidden ground plane, for example, as shown in FIGS. 9A-9D.

Figure 9:
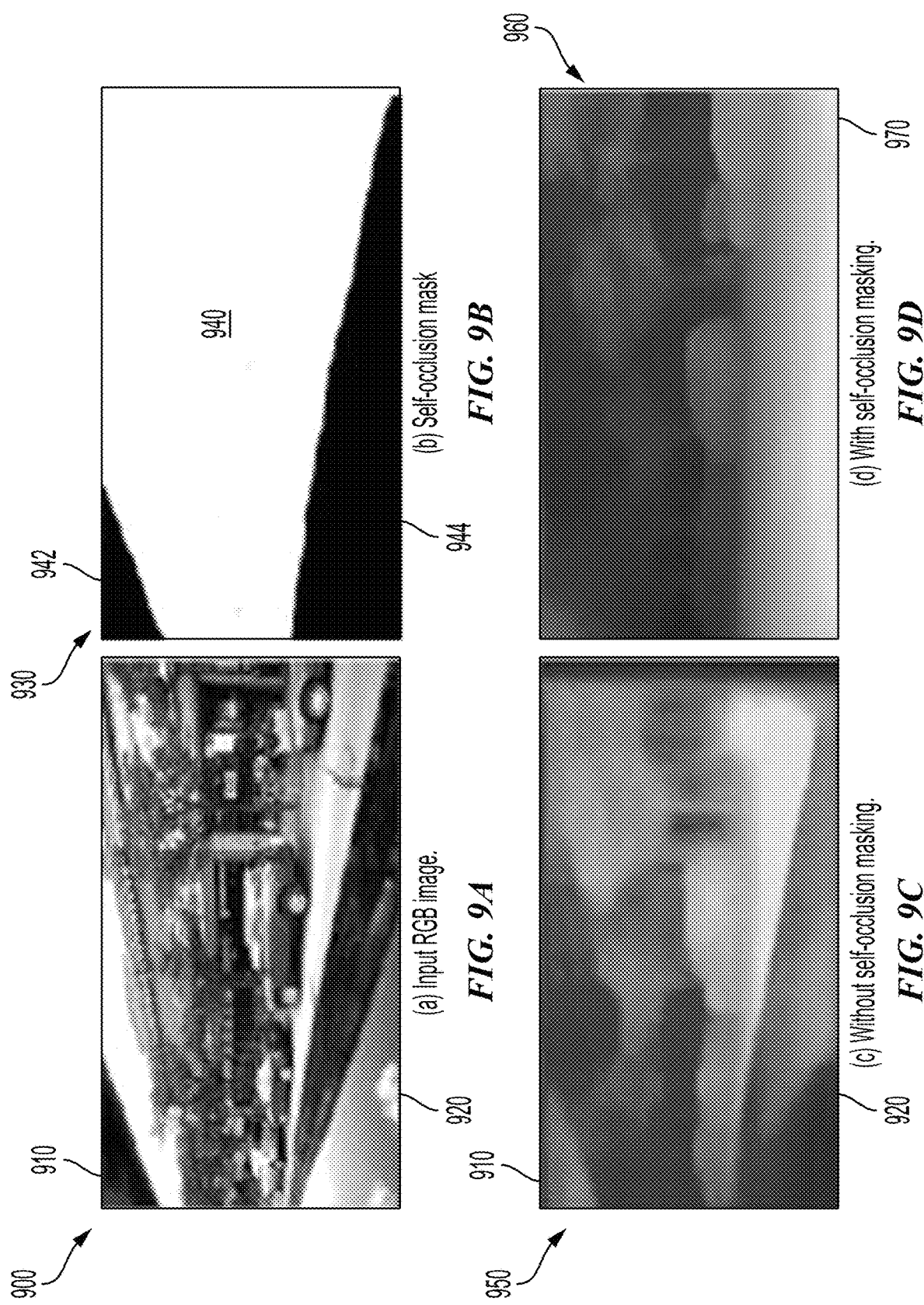
FIGS. 9A-9D are diagrams illustrating application of self-occlusion masks, according to aspects of the present disclosure.

FIGS. 9A-9D are diagrams illustrating application of self-occlusion masks, according to aspects of the present disclosure. Aspects of the present disclosure address one key challenge in self-supervised depth and ego-motion estimation in a multi-camera real-world setting. In these multi-camera real-world settings, hardware design constraints prevent an optimal placement of cameras that avoids self-occlusions. FIG. 9A illustrates an input RGB image 900 including a first self-occluded area 910 and a second self-occluded area 920. The first self-occluded area 910 may be due to an interior of the vehicle near the windshield, and the second self-occluded area 920 may be due to a hood of the vehicle.

FIG. 9B is a diagram illustrating a hard-coded binary mask, according to aspects of the present disclosure. FIG. 9B illustrates a hard-coded binary mask 930 generated by

TABLE 1

| | | Multi-camera photometric loss (Multi) vs. Standard photometric loss (Mono) | | | | | | | |
|---|---|---|---|---|---|---|---|---|---|
| | | | Lower is better ↓ | | | | | Higher is better ↑ | |
| | Camera | Abs. Rel | Sqr. Rel | RMSE | $RMSE_{log}$ | SILog | $\delta < 1.25$ | $\delta < 1.25^2$ | $\delta < 1.25^3$ |
| Mono | 01 | 0.143 | 3.133 | 13.875 | 0.237 | 23.029 | 0.828 | 0.935 | 0.970 |
| (Shared) | 05 | 0.227 | 3.624 | 13.545 | 0.365 | 30.685 | 0.623 | 0.840 | 0.917 |
| | 06 | 0.253 | 4.197 | 13.324 | 0.400 | 33.375 | 0.582 | 0.821 | 0.905 |
| | 07 | 0.264 | 4.103 | 14.038 | 0.419 | 31.827 | 0.509 | 0.778 | 0.890 |
| | 08 | 0.263 | 3.856 | 12.739 | 0.419 | 34.001 | 0.530 | 0.795 | 0.896 |
| | 09 | 0.236 | 4.235 | 16.729 | 0.386 | 30.137 | 0.558 | 0.814 | 0.911 |
| Multi | 01 | 0.138 | 2.924 | 14.041 | 0.232 | 22.557 | 0.826 | 0.937 | 0.971 |
| (Shared) | 05 | 0.218 | 3.363 | 13.172 | 0.351 | 30.966 | 0.655 | 0.848 | 0.923 |
| | 06 | 0.241 | 3.896 | 12.827 | 0.377 | 32.893 | 0.621 | 0.835 | 0.914 |
| | 07 | 0.249 | 3.761 | 13.289 | 0.384 | 32.133 | 0.580 | 0.818 | 0.908 |
| | 08 | 0.257 | 3.549 | 12.096 | 0.393 | 33.719 | 0.568 | 0.821 | 0.910 |
| | 09 | 0.205 | 3.629 | 15.419 | 0.334 | 30.211 | 0.668 | 0.865 | 0.936 |

Table 1 illustrates a comparison of multi-camera photometric loss relative to standard photometric loss. That is, Table 1 illustrates depth estimate results using the multi-camera photometric loss ("Multi") relative to standard photometric loss ("Mono"). In Table 1, the results are scaled and manually segmenting the first self-occluded area 910 and the second self-occluded area 920 of the input RGB image 900. In aspects of the present disclosure, a hard-coded binary mask 930 is generated for each camera of the multi-camera rig. In this configuration, the hard-coded binary mask 930 is composed of a grid with the same resolution as the input RGB image 900. For example, the hard-coded binary mask 930 containing ones 940 (e.g., white area) where there is no self-occlusion. In addition, zeros 942 and 944 (e.g., black areas) where there are occlusions, for example, due to the first self-occluded area 910 and the second self-occluded area 920 of the input RGB image 900.

In a multi-camera setting there are two scenarios that are particularly harmful to self-supervised depth and ego-motion learning: non-overlapping areas, due to large changes in viewpoint between cameras, and self-occlusions. As noted, self-occlusions are due to camera positioning that results in the platform (e.g., the ego vehicle) partially covering the image, as shown in FIG. 9B. A final masked photometric loss used during training (e.g., Equation (2)) may be computed as follows:

$$\mathcal{L}_{mp}(I_t, \hat{I}_t) = \mathcal{L}_p(I_t, \hat{I}_t) \odot \mathcal{M}_{no} \odot \mathcal{M}_{so} \quad (7)$$

where $\odot$ denotes element-wise multiplication, and $\mathcal{M}_{no}$ and $\mathcal{M}_{so}$ are binary masks, respectively, for non-overlapping and self-occluded areas, as described in FIGS. 9A and 9B.

As shown in FIGS. 9A and 9B, non-overlapping area masks are generated by jointly warping the input RGB image 900 in a unitary tensor of similar spatial dimensions, using nearest-neighbor interpolation, in aspects of the present disclosure. In this example, the warped tensor is used to mask the photometric loss, thus avoiding gradient back-propagation in areas where there is no overlap between frames. In some aspects of the present disclosure, this unitary warping involves network predictions and, therefore, is constantly updated at training time and extending this concept to a spatio-temporal multi-camera setting. For example, FIG. 8 shows examples of spatial and temporal non-overlapping masks on a 360° dataset, with a trained model. As illustrated, temporal contexts have a large amount of frame-to-frame overlap (e.g., >90%), even considering side-pointing cameras. Spatial context overlaps, on the other hand, are much smaller (e.g., <20%), due to radically different camera orientations with the multi-camera rig of the ego vehicle.

FIGS. 9C and 9D illustrate the impact of self-occlusion masking on depth estimation results on the 360° dataset. These masks remove self-occluded regions from the photometric loss that are unsuitable for self-supervised depth and ego-motion learning, for example, as shown in the third row 830 of FIG. 8. As shown in FIG. 9B, the hard-coded binary mask 930 is used during training to avoid gradient back-propagation in self-occluded areas of images by multiplying a photometric loss with the hard-coded binary masks.

For example, where there are zeros (e.g., self-occlusion) in the hard-coded binary mask 930, a gradient is nullified and not taken into consideration. Conversely, where there are ones (e.g., no self-occlusion) in the hard-coded binary mask 930, the gradients are untouched and remain the same during back-propagation. In these aspects of the present disclosure, the photometric loss is masked rather than the input image. In addition, no masking is performed at test time. The introduction of these self-occlusion masks results in a substantial improvement in overall performance. In particular, these self-occlusion masks enable self-supervised depth and ego-motion learning under these conditions.

As shown in FIG. 9C, specular self-occlusions create serious errors in a predicted depth map 950 generated by a network when auto-masking is enabled. Aspects of the present disclosure provide an approach of creating manual masks for each camera of the multi-camera rig 600 of FIG. 6, assuming the camera extrinsics remain constant. As shown in FIG. 9D, and ablated in experiments, the introduction of the hard-coded binary mask 930 results in a substantial improvement in overall performance of a predicted depth map 960 (as shown in FIG. 9D). This substantial improvement in overall performance enables self-supervised depth and ego-motion learning under these conditions.

As further illustrated in FIG. 9D, self-occluded areas in the predicted depth map 960 are correctly "in-painted" to include the hidden ground plane 970. In-painting of the hidden ground plane 970 is likely due to multi-camera training, in which a region that is not occluded in one camera is used to resolve occlusions in another camera. A depth and ego-motion estimation process based on a self-occlusion masked multi-camera projection loss is further described in FIG. 10.

Figure 10:
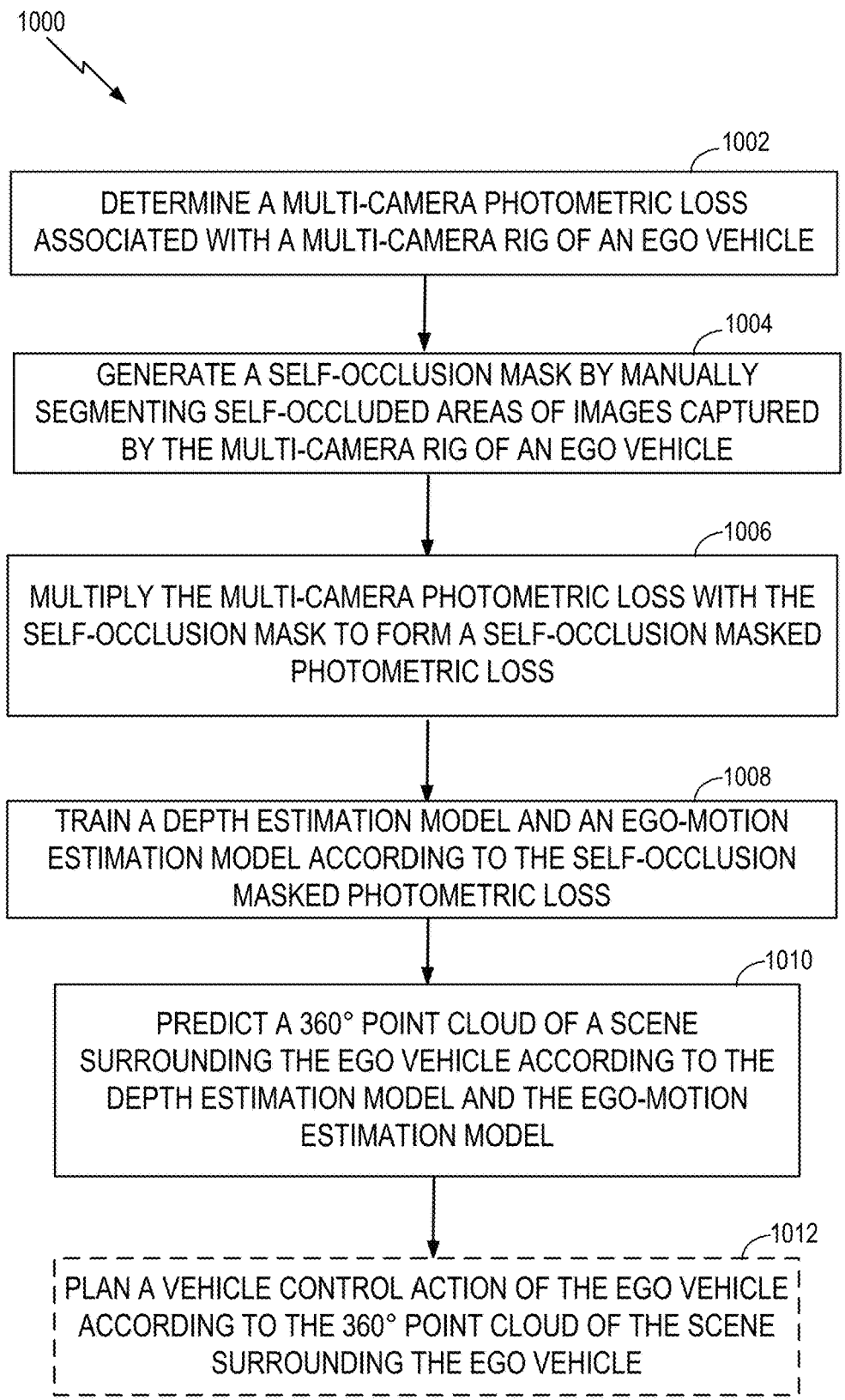
FIG. 10 is a flowchart illustrating a method for self-supervised depth and ego-motion learning, according to aspects of the present disclosure.

FIG. 10 is a flowchart illustrating a method for self-supervised depth and ego-motion learning based on self-occlusion masked multi-camera projection loss, according to aspects of the present disclosure. The method 1000 begins at block 1002, in which a multi-camera photometric loss associated with a multi-camera rig of an ego vehicle is determined. For example, FIG. 8 shows examples of warped images and corresponding photometric losses based on the images 510 of FIG. 5. Particularly, the fifth row 850 and the sixth row 860 show examples of multi-camera photometric losses using purely spatial contexts (Equation (5)) and spatio-temporal contexts (Equation (6)).

At block 1004, a self-occlusion mask is generated by manually segmenting self-occluded areas of images captured by the multi-camera rig of an ego vehicle. For example, FIG. 9B illustrates a hard-coded binary self-occlusion mask, according to aspects of the present disclosure. The hard-coded binary mask 930 is generated by manually segmenting the first self-occluded area 910 and the second self-occluded area 920 in the input RGB image 900. The hard-coded binary mask 930 may be generated for each camera of the multi-camera rig 600, as shown in FIG. 6. In this configuration, the hard-coded binary mask 930 is composed of a grid with the same resolution as the input RGB image 900. For example, the hard-coded binary mask 930 contains ones 940 (e.g., white area) where there are no self-occlusions. In addition, zeros 942 and 944 (e.g., black areas) where there are occlusions, for example, due to the first self-occluded area 910 and the second self-occluded area 920 of the input RGB image 900.

At block 1006, the multi-camera photometric loss is multiplied with the self-occlusion mask to form a self-occlusion masked photometric loss. For example, FIGS. 9C and 9D illustrate the impact of self-occlusion masking on depth estimation results on a 360° dataset. These masks remove self-occluded regions from the photometric loss that are unsuitable for self-supervised depth and ego-motion learning, for example, as shown in the third row 830 of FIG. 8. As shown in FIG. 9D, the hard-coded binary mask 930 is used during training to avoid gradient back-propagation in self-occluded areas of images, by multiplying a photometric loss with the hard-coded binary masks. As further illustrated in FIG. 9D, self-occluded areas in the predicted depth map 960 are correctly "in-painted" to include the hidden ground plane 970.

At block 1008, a depth estimation model and an ego-motion estimation model are trained according to the self-occlusion masked photometric loss. For example, as shown in FIG. 3, the self-occlusion masked photometric loss of the self-occlusion masking module 314 is used to train models by the depth and ego-motion training module 316. These aspects of the present disclosure jointly train depth and ego-motion networks using the self-occlusion masked photometric loss. Training of the depth estimation model and the ego-motion model may include leveraging cross-camera temporal contexts via spatio-temporal photometric constraints to increase an amount of overlap between cameras of the multi-camera rig using a predicted ego-motion of the ego vehicle.

At block 1010, a 360° point cloud of a scene surrounding the ego vehicle is predicted according to the depth estimation model and the ego-motion estimation model. For example, FIG. 5 is a diagram illustrating a full surround mono-depth (FSM) 360° point cloud 500 generated using self-supervised learning of depth and ego-motion networks in a wide-baseline 360° multi-camera setting, according to aspects of the present disclosure. In this configuration, the FSM 360° point cloud 500 is generated from images 510 (510-1, 510-2, 510-3, 510-4, 510-5, and 510-6) that capture a scene surrounding an ego vehicle.

At block 1012, a vehicle control action of the ego vehicle is planned according to the 360° point cloud of the scene surrounding the ego vehicle. For example, as shown in FIG. 3, the depth and ego-motion estimation system 300 may be configured for planning and control of an ego vehicle using an FSM 360° point cloud from frames of a multi-camera rig during operation of the ego vehicle, for example, as shown in FIG. 4.

The method 1000 may determine the multi-camera photometric loss by capturing images of the scene surrounding the ego vehicle using the multi-camera rig of the ego vehicle, in which cameras of the multi-camera rig have a predetermined minimum overlap. The method 1000 also includes selecting target images and context images captured by the cameras of the multi-camera rig of the ego vehicle at a same time-step and at different time-steps. The method further includes performing spatial-temporal transformations of the selected target images and the context images to determine the multi-camera photometric loss. Alternatively, the method 1000 performs spatial-temporal transformations by warping target images and context images captured by different cameras of the multi-camera rig at different time-steps according to a predicted ego-motion of the ego vehicle and known extrinsics of the different cameras. The method 1000 also includes enforcing pose consistency constraints to ensure cameras of the multi-camera rig follow a same rigid body motion to train the depth estimation model and the ego-motion estimation model without any ground-truth depth or ego-motion labels.

Aspects of the present disclosure extend monocular self-supervised depth and ego-motion estimation to large-baseline multi-camera rigs. These aspects of the present disclosure use generalized spatio-temporal and pose consistency constraints across all cameras, and carefully designed photometric loss masking to learn a single network generating dense, consistent, and scale-aware point clouds that cover the full 360° field of view of a LIDAR scanner. These aspects of the present disclosure provide a new scale-consistent evaluation metric more suitable to multi-camera settings. In particular, aspects of the present disclosure extend self-supervised depth and ego-motion learning to the general multi-camera setting, where cameras can have different intrinsics and minimally overlapping regions, as specified to reduce the number of cameras on a vehicle rig while providing a full 360° coverage.

In some aspects of the present disclosure, the method 1000 may be performed by the system-on-a-chip (SOC) 100 (FIG. 1) or the software architecture 200 (FIG. 2) of the ego vehicle 150 (FIG. 1). That is, each of the elements of the method 1000 may, for example, but without limitation, be performed by the SOC 100, the software architecture 200, or the processor (e.g., CPU 102) and/or other components included therein of the ego vehicle 150.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application-specific integrated circuit (ASIC), a field-programmable gate array signal (FPGA) or other programmable logic device (PLD), discrete gate or transistor logic, discrete hardware components, or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media may include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application-specific integrated circuit (ASIC) with the processor, the bus interface, the user interface, supporting circuitry, and at least a portion of the machine-readable media integrated into a single chip, or with one or more field-programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc; where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for self-supervised depth and ego-motion estimation, the method comprising:
    determining a multi-camera photometric loss associated with a multi-camera rig of an ego vehicle;
    generating a self-occlusion mask by manually segmenting self-occluded areas of images captured by the multi-camera rig of the ego vehicle;
    multiplying the multi-camera photometric loss with the self-occlusion mask to form a self-occlusion masked photometric loss;
    training a depth estimation model and an ego-motion estimation model according to the self-occlusion masked photometric loss by leveraging cross-camera temporal contexts via spatio-temporal photometric constraints to increase an amount of overlap between cameras of the multi-camera rig using a predicted ego-motion of the ego vehicle; and
    predicting a 360° point cloud of a scene surrounding the ego vehicle according to the depth estimation model and the ego-motion estimation model.

2. The method of claim 1, in which determining the multi-camera photometric loss comprises:
    capturing images of the scene surrounding the ego vehicle using the multi-camera rig of the ego vehicle, in which cameras of the multi-camera rig have a predetermined minimum overlap;
    selecting target images and context images captured by the cameras of the multi-camera rig of the ego vehicle at a same time-step and at different time-steps; and
    performing spatial-temporal transformations of the selected target images and the context images to determine the multi-camera photometric loss.

3. The method of claim 2, in which performing the spatial-temporal transformations comprises warping the selected target images and the context images captured by different cameras of the multi-camera rig at different time-steps according to a predicted ego-motion of the ego vehicle and known extrinsics of the different cameras.

4. The method of claim 2, in which performing the spatial-temporal transformations comprises:
    warping target images and source images captured by a same camera of the multi-camera rig at different time-steps; and
    warping the context images and target images between different cameras and captured at the different time-steps according to a predicted ego-motion and known extrinsics of the different cameras.

5. The method of claim 1, in which generating the self-occlusion mask comprises:
    identifying the self-occluded areas of the images captured by the multi-camera rig of the ego vehicle; and
    generating a hard-coded binary mask having zeros (0) in the self-occluded areas and ones (1) in non-occluded areas.

6. The method of claim 1, in which training comprises enforcing pose consistency constraints to ensure cameras of the multi-camera rig follow a same rigid body motion to train the depth estimation model and the ego-motion estimation model without any ground-truth depth or ego-motion labels.

7. The method of claim 1, further comprising planning a vehicle control action of the ego vehicle according to the 360° point cloud of the scene surrounding the ego vehicle.

8. A non-transitory computer-readable medium having program code recorded thereon for self-supervised depth and ego-motion estimation, the program code being executed by a processor and comprising:
    program code to determine a multi-camera photometric loss associated with a multi-camera rig of an ego vehicle;
    program code to generate a self-occlusion mask by manually segmenting self-occluded areas of images captured by the multi-camera rig of the ego vehicle;
    program code to multiply the multi-camera photometric loss with the self-occlusion mask to form a self-occlusion masked photometric loss;
    program code to train a depth estimation model and an ego-motion estimation model according to the self-occlusion masked photometric loss by program code to leverage cross-camera temporal contexts via spatio-temporal photometric constraints to increase an amount of overlap between cameras of the multi-camera rig using a predicted ego-motion of the ego vehicle; and
    program code to predict a 360° point cloud of a scene surrounding the ego vehicle according to the depth estimation model and the ego-motion estimation model.

9. The non-transitory computer-readable medium of claim 8, in which the program code to determine the multi-camera photometric loss comprises:
    program code to capture images of the scene surrounding the ego vehicle using the multi-camera rig of the ego vehicle, in which cameras of the multi-camera rig have a predetermined minimum overlap;
    program code to select target images and context images captured by the cameras of the multi-camera rig of the ego vehicle at a same time-step and at different time-steps; and
    program code to perform spatial-temporal transformations of the selected target images and the context images to determine the multi-camera photometric loss.

10. The non-transitory computer-readable medium of claim 9, in which the program code to perform the spatial-temporal transformations comprises program code to warp the selected target images and the context images captured by different cameras of the multi-camera rig at different time-steps according to a predicted ego-motion of the ego vehicle and known extrinsics of the different cameras.

11. The non-transitory computer-readable medium of claim 9, in which the program code to perform the spatial-temporal transformations comprises:
   program code to warp the target images and source images captured by a same camera of the multi-camera rig at different time-steps; and
   program code to warp the context images and the target images between different cameras and captured at the different time-steps according to a predicted ego-motion and known extrinsics of the different cameras.

12. The non-transitory computer-readable medium of claim 8, in which the program code to generate the self-occlusion mask comprises:
   program code to identify the self-occluded areas of the images captured by the multi-camera rig of the ego vehicle; and
   program code to generate a hard-coded binary mask having zeros (0) in the self-occluded areas and ones (1) in non-occluded areas.

13. The non-transitory computer-readable medium of claim 8, in which program code to train comprises program code to enforce pose consistency constraints to ensure cameras of the multi-camera rig follow a same rigid body motion to train the depth estimation model and the ego-motion estimation model without any ground-truth depth or ego-motion labels.

14. The non-transitory computer-readable medium of claim 8, further comprising program code to plan a vehicle control action of the ego vehicle according to the 360° point cloud of the scene surrounding the ego vehicle.

15. A system for self-supervised depth and ego-motion estimation, the system comprising:
   a multi-camera photometric loss module to determine a multi-camera photometric loss associated with a multi-camera rig of an ego vehicle;
   a self-occlusion masking module to generate a self-occlusion mask by manually segmenting self-occluded areas of images captured by the multi-camera rig of the ego vehicle and to multiply the multi-camera photometric loss with the self-occlusion mask to form a self-occlusion masked photometric loss;
   a depth and ego motion training module to train a depth estimation model and an ego-motion estimation model according to the self-occlusion masked photometric loss by leveraging cross-camera temporal contexts via spatio-temporal photometric constraints to increase an amount of overlap between cameras of the multi-camera rig using a predicted ego-motion of the ego vehicle; and
   a full surround mono-depth (FSM) point cloud module to predict a 360° point cloud of a scene surrounding the ego vehicle according to the depth estimation model and the ego-motion estimation model.

16. The system of claim 15, in which the self-occlusion masking module is further to identify the self-occluded areas of the images captured by the multi-camera rig of the ego vehicle;
   and to generate a hard-coded binary mask having zeros (0) in the self-occluded areas and ones (1) in non-occluded areas.

17. The system of claim 15, in which the depth and ego-motion training module is further to leverage cross-camera temporal contexts via spatio-temporal photometric constraints to increase an amount of overlap between cameras of the multi-camera rig using a predicted ego-motion of the ego vehicle.

18. The system of claim 15, further program code to plan a vehicle control action of the ego vehicle according to the 360° point cloud of the scene surrounding the ego vehicle.

* * * * *